(12) United States Patent
Yang et al.

(10) Patent No.: US 12,513,766 B2
(45) Date of Patent: Dec. 30, 2025

(54) RECOVERY MECHANISMS FOR WIRELESS EXTENSION LINKS

(71) Applicant: QUALCOMM Incorporated, San Diego, CA (US)

(72) Inventors: Lin Yang, San Diego, CA (US); Bin Tian, San Diego, CA (US); Alecsander Petru Eitan, Haifa (IL); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 18/160,285

(22) Filed: Jan. 26, 2023

(65) Prior Publication Data

US 2024/0260114 A1 Aug. 1, 2024

(51) Int. Cl.
*H04W 76/19* (2018.01)
*H04W 74/0816* (2024.01)

(52) U.S. Cl.
CPC ....... *H04W 76/19* (2018.02); *H04W 74/0816* (2013.01)

(58) Field of Classification Search
CPC . H04W 76/19; H04W 74/0816; H04W 84/12; H04B 7/06964
See application file for complete search history.

(56) References Cited

U.S. PATENT DOCUMENTS

| 2018/0063794 A1* | 3/2018 | Sanderovich | ....... H04W 52/243 |
| 2019/0110281 A1* | 4/2019 | Zhou | ..................... H04W 16/28 |
| 2021/0136679 A1* | 5/2021 | Verma | .................. H04W 72/23 |

OTHER PUBLICATIONS

International Search Report and Written Opinion—PCT/US2023/086487—ISA/EPO—Jun. 17, 2024 (2207139WO).

* cited by examiner

*Primary Examiner* — Walli Z Butt
(74) *Attorney, Agent, or Firm* — Kevin M. Donnelly; Holland & Hart LLP

(57) ABSTRACT

This disclosure provides wireless communication methods, components, devices and systems for link recovery in wireless communication networks. Some aspects more specifically relate to the recovery of lost wireless communication links for which initial link establishment has been aided by communications over anchor links of different frequency bands than those of the lost wireless communication links. According to some aspects, a recovery mechanism can be implemented that enables involved devices to recover such "extension" links using communications over their associated frequency bands, without needing to revert to communication over their corresponding anchor links. In some examples, such a recovery mechanism can be implemented to enable recovery of a millimeter wave (mmWave) extension link of a non-standalone mmWave basic service set (BSS) without needing to revert to communication over a sub-7 GHz anchor link.

25 Claims, 15 Drawing Sheets

RECOVERY MECHANISMS FOR WIRELESS EXTENSION LINKS

TECHNICAL FIELD

This disclosure relates generally to wireless communication, and more specifically, to recovery of lost wireless communication links for which initial link establishment was aided by communications over anchor links in different frequency bands than those of the lost wireless communication links.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Various frequency bands can be used to support wireless communication links between devices in WLANs. For instance, a given link in a given WLAN may be established via a "sub-7 GHz" frequency band such as the 2.4 GHz, 5 GHz, or 6 GHz band, or via a millimeter wave (mmWave) frequency band such as the 60 GHz or 45 GHz band. In some WLANs, it may be possible for devices to establish multiple wireless links with each other via multiple respective frequency bands. In some cases, a link between two devices via one frequency band (the "anchor band") may serve as an "anchor link" that supports the establishment of another link (an "extension link") between those two devices via another frequency band (the "extension band"). In conjunction with establishing the extension link, the two devices may exchange, via the anchor link, communications associated with initial beamforming training setup for the extension link. For instance, one of the devices may send a beam search trigger to the other device via the anchor link to instruct that device to begin an initial beam search on the extension band.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device. The wireless communication device includes at least one memory and at least one processor communicatively coupled with the at least one memory, the at least one processor operable to cause the wireless communication device to transmit or receive, to or from an access point via a first frequency band, one or more packets associated with establishing a wireless communication link with the access point in a second frequency band, initiate a link recovery procedure associated with a loss of the wireless communication link, the link recovery procedure including transmitting, to the access point, one or more first training sequences via the second frequency band and receiving, from the access point, one or more second training sequences via the second frequency band, and communicate with the access point via the wireless communication link associated with a recovery of the wireless communication link via the link recovery procedure.

Another innovative aspect of the subject matter described in this disclosure can be implemented in a method for wireless communication. The method includes transmitting or receiving, to or from an access point via a first frequency band, one or more packets associated with establishing a wireless communication link with the access point in a second frequency band, initiating a link recovery procedure associated with a loss of the wireless communication link, the link recovery procedure including transmitting, to the access point, one or more first training sequences via the second frequency band and receiving, from the access point, one or more second training sequences via the second frequency band, and communicating with the access point via the wireless communication link associated with a recovery of the wireless communication link via the link recovery procedure.

In some examples of the methods and wireless communication devices, the first frequency band can be a sub-7 GHz frequency band, and the second frequency band can be an mmWave frequency band. In some examples of the methods and wireless communication devices, the second frequency band can be a 60 GHz frequency band or a 45 GHz frequency band.

In some examples, the methods and wireless communication devices may initiate the link recovery procedure during a service period (SP) or a transmission opportunity (TXOP) obtained by the wireless communication device. In some examples, the methods and wireless communication devices may initiate the link recovery procedure during a headroom interval at an end of the SP or TXOP. In some examples, the methods and wireless communication devices may initiate a request-to-send (RTS)/clear-to-send (CTS) exchange during the SP or TXOP, and detect the loss of the wireless communication link associated with a failure of the RTS/CTS exchange. In some examples, the methods and wireless communication devices may initiate the link recovery procedure outside of any SP or TXOP obtained by the wireless communication device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
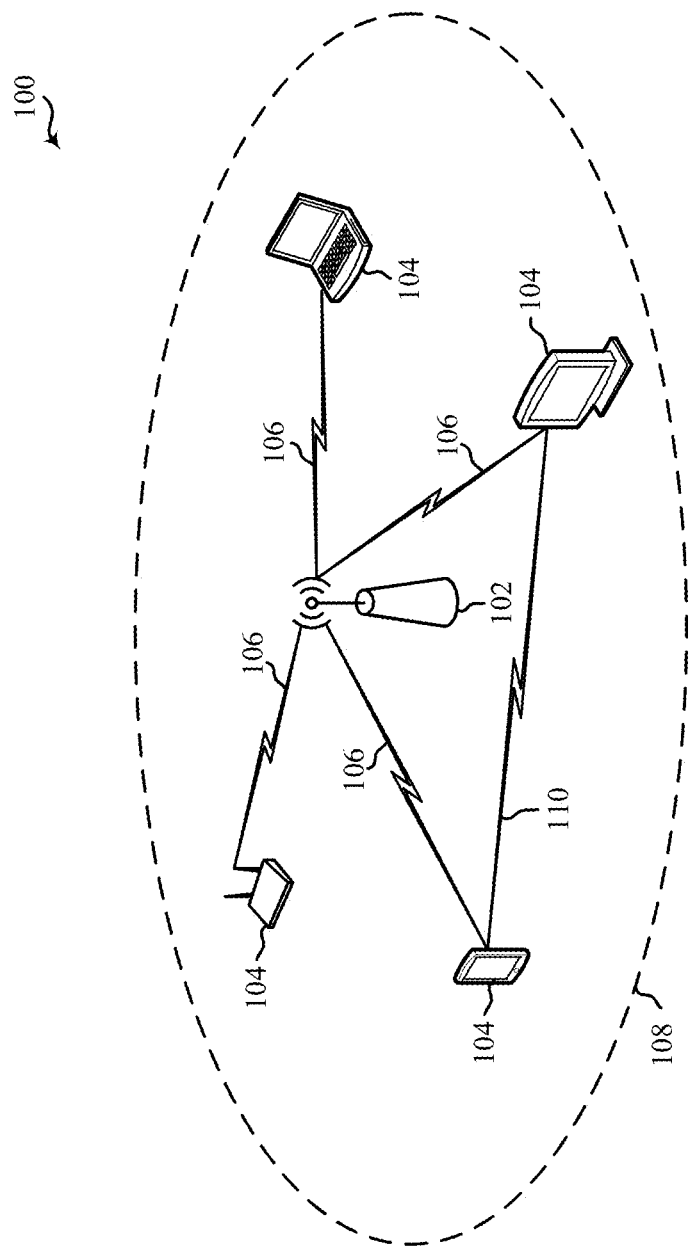
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the $3^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication, and more particularly to link recovery in wireless communication networks. Some aspects more specifically relate to the recovery of a lost wireless communication link for which initial link establishment thereof was facilitated via communication over an anchor link in a different frequency band than that in which the lost wireless communication link is in. Such a wireless communication link for which initial link establishment is facilitated by communication over an anchor link in a different frequency band is also referred to herein as an "extension link." According to some aspects, a wireless communication device can perform a recovery mechanism operation that enables the wireless communication device to recover an extension link via communication over the frequency band in which the extension link is located without needing to resort to communicating over an associated anchor link in a different frequency band or range to recover the extension link. In some examples, the wireless communication device can perform such an extension link recovery operation to enable recovery of a millimeter wave (mmWave) extension link of a non-standalone mmWave basic service set (BSS) without needing to communicate via a sub-7 GHz anchor link to recover the mmWave extension link.

In some examples, a wireless communication device may recover an extension link using a periodic beacon-based link recovery procedure. According to a periodic beacon-based link recovery procedure, a wireless access point (AP) can transmit training sequences during a respective beacon transmission interval within each beacon interval. Within each beacon transmission interval, the wireless AP can perform a transmit sector-level sweep (Tx-SLS) in the frequency band associated with the extension link (also referred to herein as the "extension band"), during which it sequentially transmits a training sequence through each of its transmit (Tx) sectors. A wireless station (STA) that determines that its extension link with the wireless AP has been lost can wait until a start of such a beacon transmission interval and then conduct a beam search based on the training sequence transmissions by the wireless AP.

In some examples, a wireless communication device may recover an extension link using a distributed short beacon-based link recovery procedure. According to a distributed short beacon-based link recovery procedure, a wireless AP can implement short beacon transmission intervals that are distributed in time across each beacon interval. Rather than performing a full Tx-SLS on all Tx sectors in the extension band within a single regular beacon transmission interval in a given beacon interval, the wireless AP can perform, for each of the short beacon transmission intervals, a respective portion of the Tx-SLS that comprises training sequence transmissions in only a respective subset of the Tx sectors. A wireless STA that determines that its extension link with the wireless AP has been lost can start a beam search at the earliest next short beacon transmission interval based on the respective subset of training sequence transmissions by the wireless AP.

In some examples, a wireless communication device may recover an extension link using a STA-initiated fast link recovery procedure. According to a STA-initiated fast link recovery procedure, a wireless STA can proactively initiate link recovery by transmitting training sequences in the extension band. In some examples, the wireless STA may be permitted to begin transmitting the training sequences in the extension band at any time that is not during a service period (SP) or a transmission opportunity (TXOP) of the wireless STA (any "non-SP/TXOP" time). In some other examples, the wireless STA may be permitted to begin transmitting the training sequences in the extension band during an SP or a TXOP of the wireless STA. For instance, in some examples, a wireless STA can initiate a request-to-send (RTS)/clear-to-send (CTS) exchange by transmitting an RTS at the onset of an SP or TXOP (referred to collectively herein as an "SP/TXOP") to confirm that the extension link has not been lost, and can begin training sequence transmissions in the extension band during the SP/TXOP if it does not receive a CTS in response to the RTS. In some other examples in which a wireless STA is permitted to begin transmitting training sequences in the extension band during an SP/TXOP, a time interval at the end of an SP/TXOP can be designated as a "headroom interval" during which link recovery can be conducted if the extension link is lost. In such examples, the wireless STA can begin training sequence transmissions during the headroom interval of the SP/TXOP if it has detected loss of the extension link during that SP/TXOP.

In some examples, a wireless communication device can recover an extension link using a monitored-link flexible link recovery procedure. According to the monitored-link flexible link recovery procedure, the wireless communication device can recurring verify that an extension link has not been lost. Upon initial establishment of the extension link, the wireless communication device can set a "watchdog" counter or timer to begin counting down from a predetermined value representing an amount of time for which the extension link is assumed to be sound (that is, assumed not to be lost). In such examples, if successful communication occurs prior to expiration of the watchdog counter, the wireless communication device can reset the watchdog counter to the original predetermined value. Additionally, while the watchdog counter is still counting down, the wireless communication device can initiate a beamforming sync-up exchange to check the integrity of the extension link (that is, to check whether the extension link has been lost). In such examples, if the beamforming sync-up is successful, indicating that the extension link is sound, the wireless communication device can reset the watchdog counter. If the beamforming sync-up is unsuccessful, the wireless communication device can begin transmitting training sequences upon the watchdog counter reaching zero, to initiate recovery of the extension link.

Particular aspects of the subject matter described in this disclosure can be implemented to realize one or more of the following potential advantages. In some examples, techniques described herein can enable devices affected by a loss of an extension link between them to recover the extension link without incurring link switch delays or other inefficiencies associated with reverting to communication over an associated anchor link. In some examples, use of a periodic beacon-based link recovery procedure can make link recovery relatively simple by leveraging the existing beacon interval structure used to support network discovery. In some other examples, by time-distributing the training sequence transmissions of the Tx-SLS across a series of short beacon transmission intervals, a distributed short beacon-based link recovery procedure can offer the additional benefit of reducing the amount of waiting time associated with extension link recovery relative to a periodic beacon-based link recovery procedure. In some other examples, by enabling a wireless STA to proceed directly with training sequence transmissions upon detection of link failure rather than needing to wait for the wireless AP to transmit training sequences during a beacon transmission interval or short beacon transmission interval, a STA-initiated fast link recovery procedure also can beneficially eliminate or reduce the waiting time associated with initiating link recovery. In some other examples, by proactively checking the integrity of an extension link on a recurring basis, a monitored-link flexible link recovery procedure can enable earlier detection of extension link loss and earlier initiation of link recovery measures.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
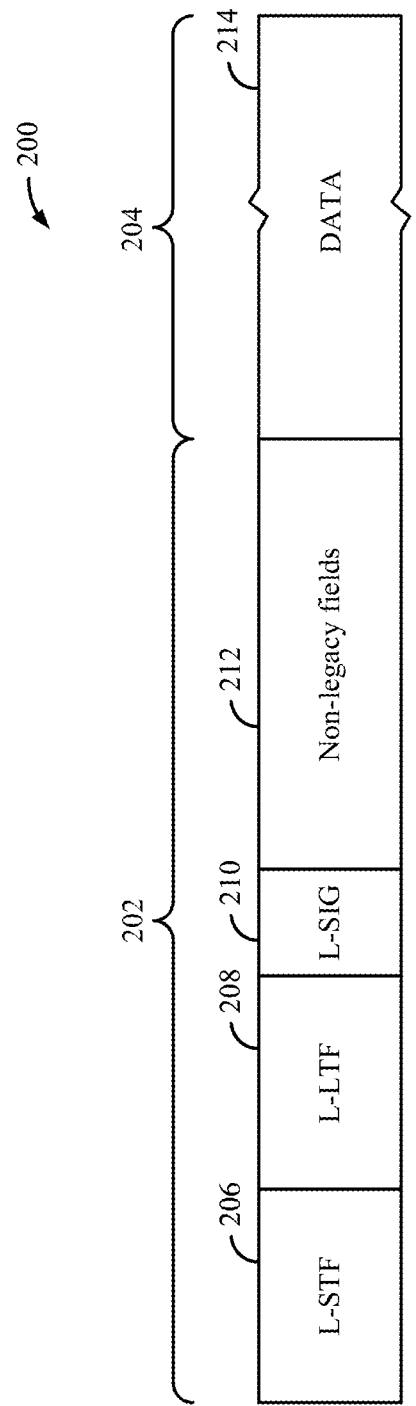
FIG. 2 shows an example protocol data unit (PDU) usable for communications between a wireless access point and one or more wireless stations.

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
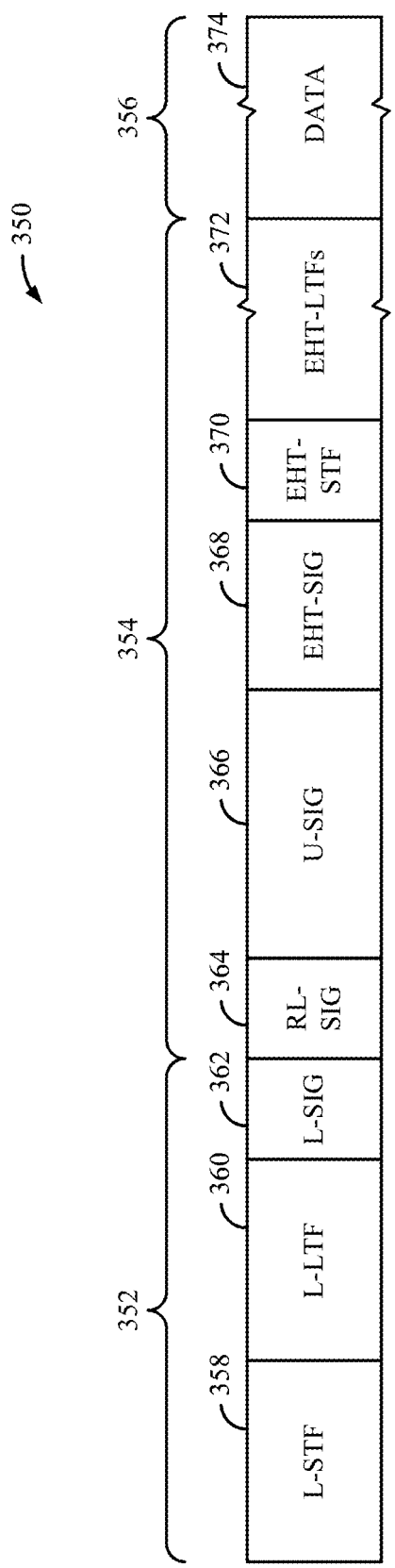
FIG. 3 shows an example physical layer (PHY) protocol data unit (PPDU) usable for communications between a wireless access point (AP) and one or more wireless stations (STAs).

FIG. 3 shows another example PPDU 350 usable for wireless communication between a wireless AP and one or more wireless STAs. The PPDU 350 may be used for SU, OFDMA or MU-MIMO transmissions. The PPDU 350 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP to identify and inform one or multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some examples, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (for example, identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (for example, identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). There are different CW and TXOP durations for each of the four access categories (ACs): voice (AC_VO), video (AC_VI), background (AC_BK), and best effort (AC_BE). This enables particular types of traffic to be prioritized in the network.

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, If a receiving device cannot properly decode (and cannot correct the errors) a first HARQ transmission received from the transmitting device, the receiving device may transmit a HARQ feedback message to the transmitting device (for example, a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an ARQ protocol). Such switching may reduce feedback overhead and increase the flexibility for retransmissions by enabling devices to dynamically switch between ARQ and HARQ protocols during frame exchanges. Some implementations also may enable multiplexing of communications that employ ARQ with those that employ HARQ.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas.

APs and STAs that include multiple antennas also may support space-time block coding (STBC). With STBC, a transmitting device also transmits multiple copies of a data stream across multiple antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams. The $N_{SS}$ spatial streams may be mapped to a number $N_{STS}$ of space-time streams, which are then mapped to $N_{Tx}$ transmit chains.

APs and STAs that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. APs and STAs that include multiple antennas also may support beamforming. Beamforming generally refers to the steering of the energy of a transmission in the direction of a target receiver. Beamforming may be used both in a single-user (SU) context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). In the MU-MIMO context, beamforming may additionally or alternatively involve the nulling out of energy in the directions of other receiving devices. To perform SU beamforming or MU-MIMO, a transmitting device, referred to as the beamformer, transmits a signal from each of multiple antennas. The beamformer configures the amplitudes and phase shifts between the signals transmitted from the different antennas such that the signals add constructively along particular directions towards the intended receiver (referred to as the beamformee) or add destructively in other directions towards other devices to mitigate interference in a MU-MIMO context. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. An NDP is a PPDU without any data field. The beamformee may then perform measurements for each of the $N_{Tx} \times N_{Rx}$ sub-channels corresponding to all of the transmit antenna and receive antenna pairs associated with the sounding signal. The beamformee generates a feedback matrix associated with the channel measurements and, typically, compresses the feedback matrix before transmitting the feedback to the beamformer. The beamformer may then generate a precoding (or "steering") matrix for the beamformee associated with the feedback and use the steering matrix to precode the data streams to configure the amplitudes and phase shifts for subsequent transmissions to the beamformee. The beamformer may use the steering matrix to determine (for example, identify, detect, ascertain, calculate, or compute) how to transmit a signal on each of its antennas to perform beamforming. For example, the steering matrix may be indicative of a phase shift, power level, etc. to use to transmit a respective signal on each of the beamformer's antennas.

A transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions or nulls by increasing the number of transmit antennas. This is especially advantageous in MU transmission contexts in which it is particularly important to reduce inter-user interference.

To increase an AP's spatial multiplexing capability, an AP may need to support an increased number of spatial streams (such as up to 16 spatial streams). However, supporting additional spatial streams may result in increased CSI feedback overhead. Implicit CSI acquisition techniques may avoid CSI feedback overhead by taking advantage of the assumption that the UL and DL channels have reciprocal impulse responses (that is, that there is channel reciprocity). For examples, the CSI feedback overhead may be reduced using an implicit channel sounding procedure such as an implicit beamforming report (BFR) technique (such as where STAs transmit NDP sounding packets in the UL while the AP measures the channel) because no BFRs are sent. Once the AP receives the NDPs, it may implicitly assess the channels for each of the STAs and use the channel assessments to configure steering matrices. In order to mitigate hardware mismatches that could break the channel reciprocity on the UL and DL (such as the baseband-to-RF and RF-to-baseband chains not being reciprocal), the AP may implement a calibration method to compensate for the mismatch between the UL and the DL channels. For example, the AP may select a reference antenna, transmit a pilot signal from each of its antennas, and estimate baseband-to-RF gain for each of the non-reference antennas relative to the reference antenna.

In some examples, multiple APs may transmit to one or more STAs at a time utilizing a distributed MU-MIMO scheme. Examples of such distributed MU-MIMO transmissions include coordinated beamforming (CBF) and joint transmission (JT). With CBF, signals (such as data streams) for a given STA may be transmitted by only a single AP. However, the coverage areas of neighboring APs may overlap, and signals transmitted by a given AP may reach the STAs in OBSSs associated with neighboring APs as OBSS signals. CBF enables multiple neighboring APs to transmit simultaneously while minimizing or avoiding interference, which may result in more opportunities for spatial reuse. More specifically, using CBF techniques, an AP may beamform signals to in-BSS STAs while forming nulls in the directions of STAs in OBSSs such that any signals received at an OBSS STA are of sufficiently low power to limit the interference at the STA. To accomplish this, an inter-BSS coordination set may be defined between the neighboring APs, which contains identifiers of all APs and STAs participating in CBF transmissions.

With JT, signals for a given STA may be transmitted by multiple coordinated APs. For the multiple APs to concurrently transmit data to a STA, the multiple APs may all need a copy of the data to be transmitted to the STA. Accordingly, the APs may need to exchange the data among each other for transmission to a STA. With JT, the combination of antennas of the multiple APs transmitting to one or more STAs may be considered as one large antenna array (which may be represented as a virtual antenna array) used for beamforming and transmitting signals. In combination with MU-MIMO techniques, the multiple antennas of the multiple APs may be able to transmit data via multiple spatial streams. Accordingly, each STA may receive data via one or more of the multiple spatial streams.

Some wireless communication devices (including both APs and STAs) are capable of multi-link operation (MLO). In some examples, MLO supports establishing multiple different communication links (such as a first link on the 2.4 GHz band, a second link on the 5 GHz band, and the third link on the 6 GHz band) between the STA and the AP. In some examples, MLO may support establishing a first link between the STA and the AP on a sub-7 GHz frequency band (such as the 2.4 GHz band, the 5 GHz band, or the 6 GHz band) and establishing a second link between the STA and the AP on a millimeter wave (mmWave) frequency band (such as the 60 GHz band or the 45 GHz band). Each communication link may support one or more sets of channels or logical entities. In some cases, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs each configured to communicate on a respective communication link with a respective one of multiple STAs of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA is simultaneously transmitted across multiple communication links in parallel to maximize the utilization of available resources to achieve higher throughput. That is, during at least some duration of time, transmissions or portions of transmissions may occur over two or more links in parallel at the same time. In some examples, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some examples, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally or alternatively be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some examples, the exchange of information may occur via a beacon signal, a probe request or probe response, an association request or an association response frame, a dedicated action frame, or an operating mode indicator (OMI), among other examples. In some examples, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD.

Figure 4:
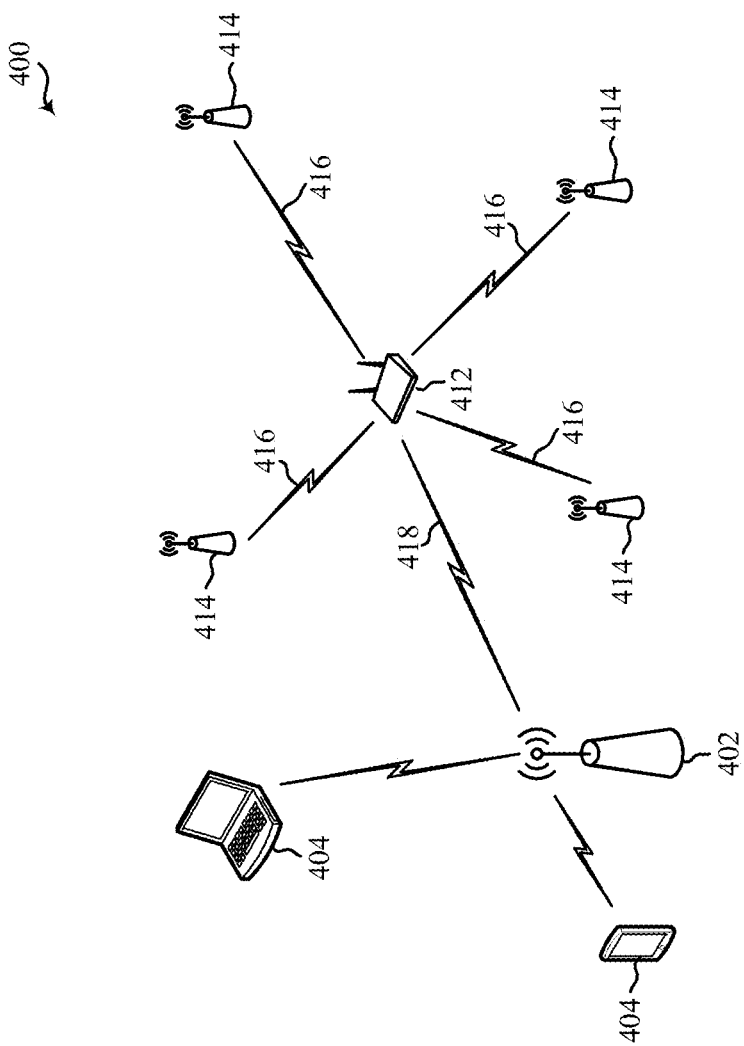
FIG. 4 shows a pictorial diagram of another example wireless communication network 400.

FIG. 4 shows a pictorial diagram of another example wireless communication network 400. According to some aspects, the wireless communication network 400 can be an example of a mesh network, an IoT network or a sensor network in accordance with one or more of the IEEE 802.11 family of wireless communication protocol standards (including the 802.11ah amendment). The wireless network 400 may include multiple wireless communication devices 414. The wireless communication devices 414 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 414 sense, measure, collect or otherwise obtain and process data and then transmit such raw or processed data to an intermediate device 412 for subsequent processing or distribution. Additionally or alternatively, the intermediate device 412 may transmit control information, digital content (for example, audio or video data), configuration information or other instructions to the wireless communication devices 414. The intermediate device 412 and the wireless communication devices 414 can communicate with one another via wireless communication links 416. In some examples, the wireless communication links 416 include Bluetooth links or other PAN or short-range communication links.

In some examples, the intermediate device 412 also may be configured for wireless communication with other networks such as with a Wi-Fi WLAN or a wireless (for example, cellular) wide area network (WWAN), which may, in turn, provide access to external networks including the Internet. For example, the intermediate device 412 may associate and communicate, over a Wi-Fi link 418, with an AP 402 of a WLAN network, which also may serve various STAs 404. In some examples, the intermediate device 412 is an example of a network gateway, for example, an IoT gateway. In such a manner, the intermediate device 412 may serve as an edge network bridge providing a Wi-Fi core backhaul for the IoT network including the wireless communication devices 414. In some examples, the intermediate device 412 can analyze, preprocess and aggregate data received from the wireless communication devices 414 locally at the edge before transmitting it to other devices or external networks via the Wi-Fi link 418. The intermediate device 412 also can provide additional security for the IoT network and the data it transports.

Figure 5:
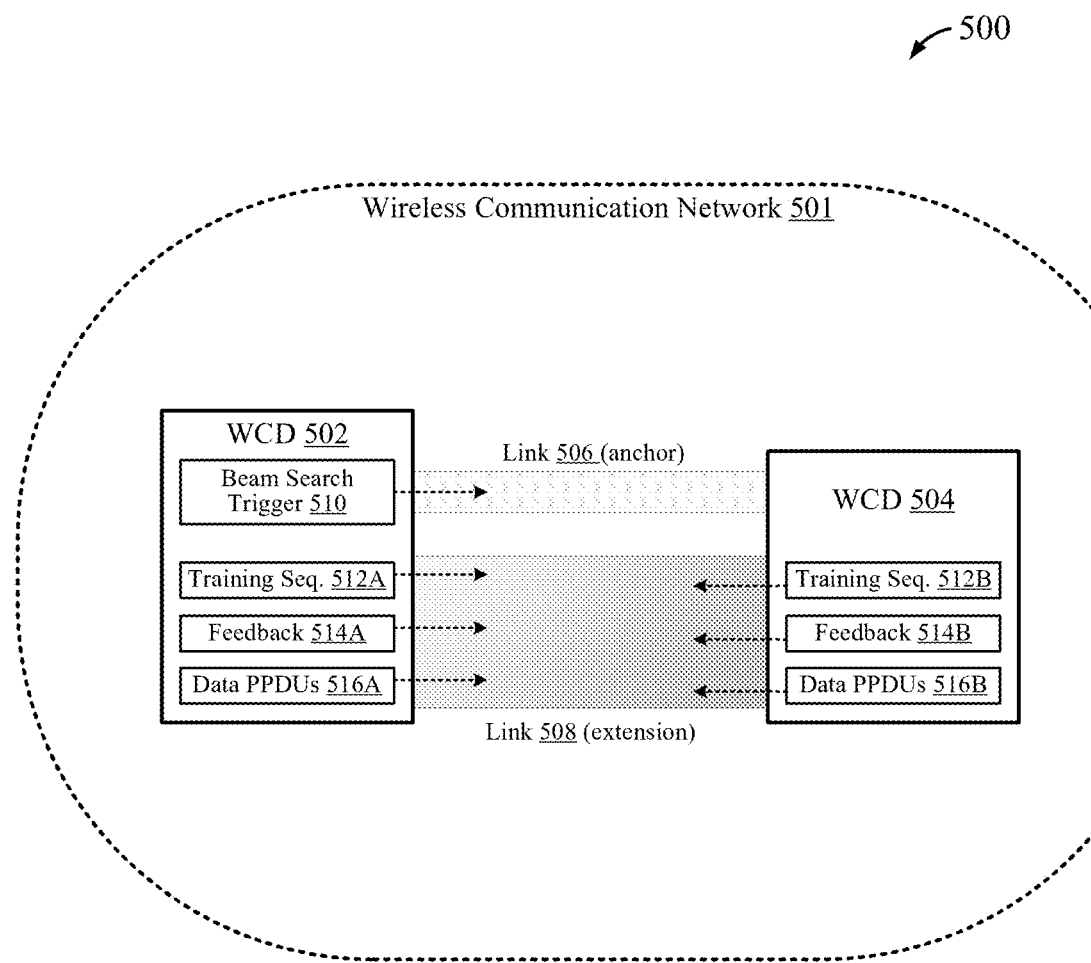
FIG. 5 shows a block diagram illustrating an example operating environment.

FIG. 5 shows a block diagram illustrating an example operating environment 500. In the operating environment 500, a wireless communication device (WCD) 502 and a wireless communication device 504 operate in a wireless communication network 501. The wireless communication network 501 can be a WLAN in which devices such as wireless communication device 502 and wireless communication device 504 wirelessly communicate according to protocols and procedures defined in the IEEE 802.11 family of wireless communication standards. In some examples, the wireless communication device 502 can operate as or within a wireless AP such as the wireless AP 102 described with reference to FIG. 1 or the wireless AP 402 described with reference to FIG. 4. In some examples, the wireless communication device 504 can operate as or within a wireless STA such as one of the wireless STAs 104 described with reference to FIG. 1 or one of the wireless STAs 404 described with reference to FIG. 4.

In the operating environment 500, a wireless communication link 506 between the wireless communication devices 502 and 504 in one frequency band can serve as an anchor link supporting a wireless communication link 508 that the wireless communication devices 502 and 504 establish in another frequency band. In some examples, the wireless communication link 506 can be a link in a sub-7 GHz frequency band, such as a wireless communication link in a 2.4 GHz band, a 5 GHz band, or a 6 GHz band. In some examples, the wireless communication link 508 can be a link in a millimeter wave (mmWave) frequency band, such as a wireless communication link in a 60 GHz band or a 45 GHz band.

In conjunction with establishing the wireless communication link 508, the wireless communication devices 502 and 504 may exchange, via the wireless communication link 506, communications associated with initial beamforming training setup for the wireless communication link 508. For instance, as shown in FIG. 5, the wireless communication device 502 may transmit a beam search trigger 510 to the wireless communication device 504 via the wireless communication link 506 to instruct the wireless communication device 504 to begin an initial beam search on the frequency band in which the wireless communication link 508 is to be established. In some examples, the wireless communication device 504 can conduct timing and frequency pre-corrections upon receiving the beam search trigger 510, and can monitor the extension band for beamforming training sequence transmissions according to control information in the beam search trigger 510. The wireless communication devices 502 and 504 can then complete the initial beamforming training setup and establish the wireless communication link 508 in the extension band.

Subsequently, some change in conditions may cause the wireless communication link 508 between the wireless communication devices 502 and 504 to be lost. Numerous factors could potentially contribute to loss of the wireless communication link 508, including changes in the positions or orientations (or both) of one or both the wireless communication devices 502 and 504, the introduction of attenuating obstacles in the surrounding environment, increased levels of interference on the extension band, and other factors.

Either (or both) of the wireless communication devices 502 and 504 may detect the loss of the wireless communication link 508. In some examples, the wireless communication device 502 or the wireless communication device 504 may detect the loss of the wireless communication link 508 based on non-receipt of one or more expected transmissions. For instance, the wireless communication device 504 may detect the loss of the wireless communication link 508 when it does not receive a PPDU that it expected to receive from the wireless communication device 502 via the wireless communication link 508. In another example, the wireless communication device 504 may detect the loss of the wireless communication link 508 when it does not receive an acknowledgment from the wireless communication device 502 of a PPDU that the wireless communication device 504 transmitted to the wireless communication device 502 via the wireless communication link 508.

In some examples, the wireless communication device 504 can initiate a link recovery procedure in response to detecting the loss of the wireless communication link 508. In some examples, according to the link recovery procedure, the wireless communication device 502 can transmit training sequences 512A on the extension band for receipt and measurement by the wireless communication device 504, the wireless communication device 504 can transmit training sequences 512B on the extension band for receipt and measurement by the wireless communication device 502, or both. In some examples, according to the link recovery procedure, the wireless communication device 504 can transmit feedback 514B to the wireless communication device 502 via the extension band based on measurements of the training sequences 512A, the wireless communication device 502 can transmit feedback 514A to the wireless communication device 504 via the extension band based on measurements of the training sequences 512B, or both.

In some examples, the link recovery procedure can be used to conduct coarse beam recovery for the wireless communication link 508 to enable the wireless communication devices 502 and 504 to resume data communications via the wireless communication link 508. In some examples, following completion of the link recovery procedure, the wireless communication device 502 may transmit one or more data PPDUs 516A to the wireless communication device 504 via the wireless communication link 508, the wireless communication device 504 may transmit one or more data PPDUs 516B to the wireless communication device 502 via the wireless communication link 508, or both.

In some examples, after conducting coarse beam recovery for the wireless communication link 508 using the link recovery procedure, the wireless communication devices 502 and 504 may conduct beam refinement for the wireless communication link 508 in conjunction with transmitting data PPDUs on the wireless communication link 508. In some examples, one or more of the data PPDUs 516A may be beam refinement protocol (BRP) PPDUs that the wireless communication device 502 transmits to the wireless communication device 504 in conjunction with a BRP phase, such as BRP-RX or BRP-TX PPDUs. In some examples, one or more of the data PPDUs 516B may be BRP PPDUs that the wireless communication device 504 transmits to the wireless communication device 502 in conjunction with a BRP phase, such as BRP-RX or BRP-TX PPDUs.

It is to be appreciated that, depending on the link recovery procedure that the wireless communication devices 502 and 504 use to recover the wireless communication link 508, some transmissions depicted in FIG. 5 may or may not be performed. For instance, in some examples, the wireless communication devices 502 and 504 may recover the wireless communication link 508 using a link recovery procedure according to which the wireless communication device 504 does not transmit the training sequences 512B, and the wireless communication device 502 does not transmit the feedback 514A.

In some examples, in conjunction with the link recovery procedure, the wireless communication devices 502 and 504 may refer to parameters retained from initial establishment, training, and refinement of the wireless communication link 508. In some examples, the retained parameters can include parameters indicating the best known combination of Tx and Rx sectors up to that point. In some examples, the retained parameters can include beam search setup parameters such as the respective numbers of Tx and Rx sectors of the wireless communication devices 502 and 504. In some examples, the retained parameters can include parameters indicating frequency errors and timing accuracies observed in the course of previous communications between the wireless communication devices 502 and 504 via the wireless communication link 508.

Figure 6:
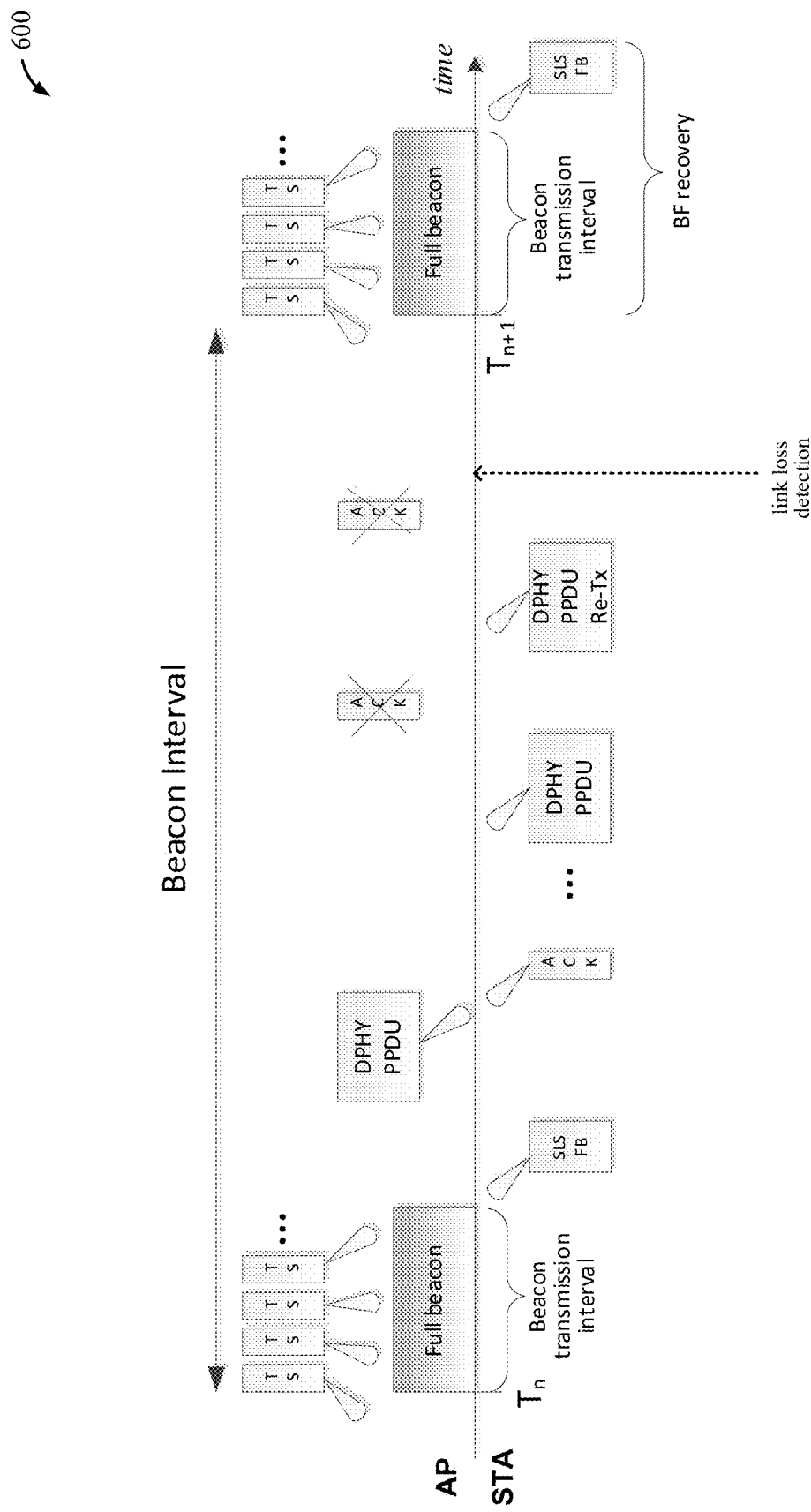
FIG. 6 shows a timing diagram depicting an example periodic beacon-based link recovery procedure.

FIG. 6 shows a timing diagram 600 depicting an example periodic beacon-based link recovery procedure. In some examples, in operating environment 500 of FIG. 5, the wireless communication devices 502 and 504 may use the example periodic beacon-based link recovery procedure depicted in FIG. 6 to recover the wireless communication link 508.

According to the example periodic beacon-based link recovery procedure depicted in FIG. 6, an AP implements dedicated periodic beacon transmission intervals. Each beacon transmission interval occurs at the beginning of a respective beacon interval. Within each such beacon transmission interval, the AP performs a Tx-SLS on the extension band, during which it sweeps training sequence transmissions through its Tx sectors. While an extension link between the AP and a STA is sound, the STA can use the training sequence transmissions of the Tx-SLS to check the link quality and verify or update the ID of the best Tx sector of the AP.

Upon detecting a loss of the extension link, such as based on non-acknowledgment of a PPDU transmission and retransmission as depicted in the example in FIG. 6, the STA can wait until the start of a next beacon transmission interval, switch to omni reception mode, and conduct coarse beam training based on the Tx-SLS of the AP. In some examples, the training sequences that the AP transmits during the Tx-SLS can be short training sequences, such as 1 µs training sequences. In some examples, the training sequences that the AP transmits during the Tx-SLS can carry the sector IDs associated with the transmissions of those training sequences. In other examples, the sector IDs may be conveyed in SIG fields. In some examples, the STA can count down to the completion of the Tx-SLS and then transmit SLS feedback to the AP.

Figure 7:
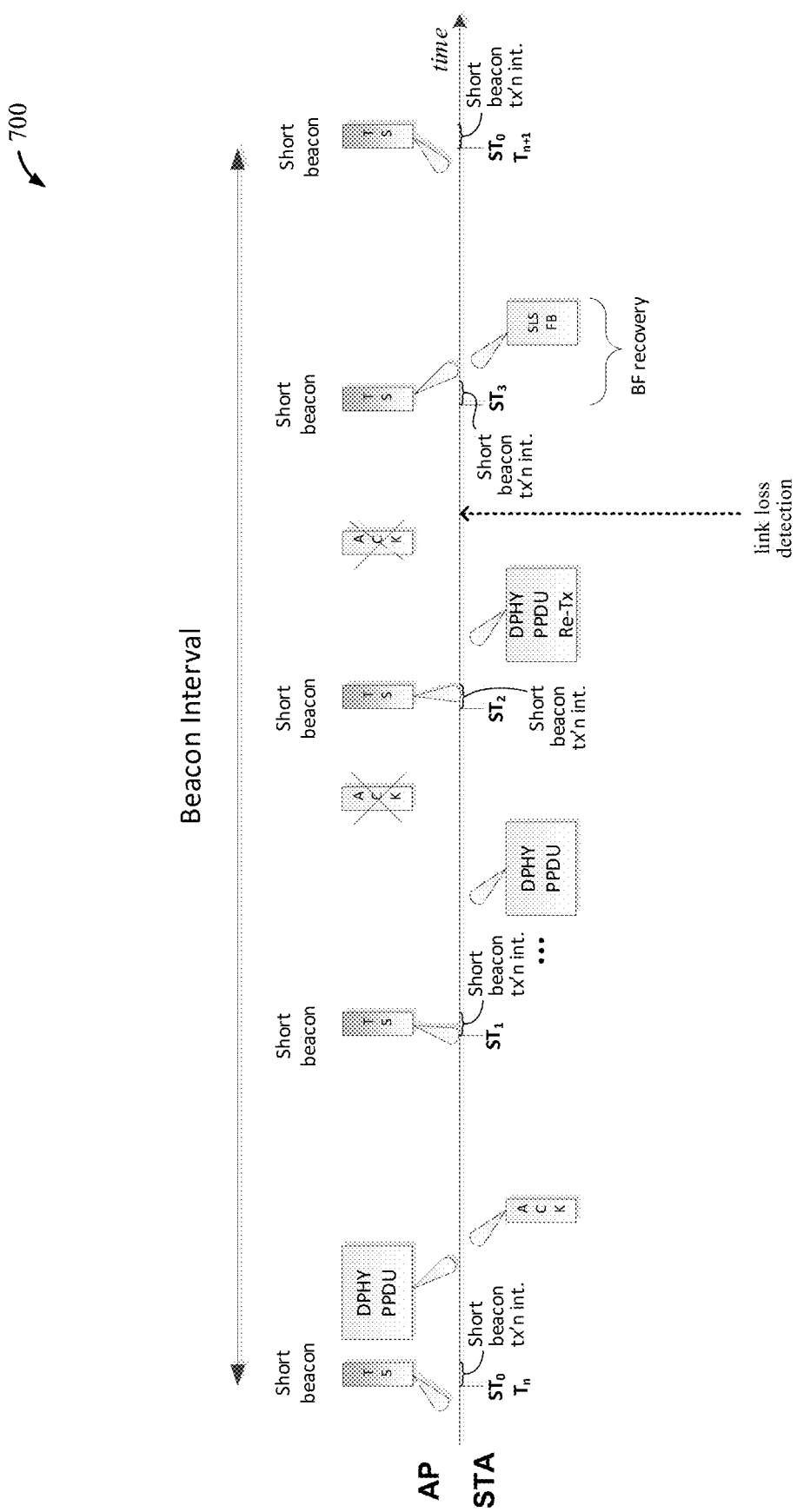
FIG. 7 shows a timing diagram depicting an example distributed short beacon-based link recovery procedure.

FIG. 7 shows a timing diagram 700 depicting an example distributed short beacon-based link recovery procedure. In some examples, in operating environment 500 of FIG. 5, the wireless communication devices 502 and 504 may use the example distributed short beacon-based link recovery procedure depicted in FIG. 7 to recover the wireless communication link 508.

According to the example distributed short beacon-based link recovery procedure depicted in FIG. 7, an AP implements short beacon transmission intervals that are distributed in time across each beacon interval. Rather than performing a full Tx-SLS on the extension band within a single beacon transmission interval in a beacon interval, the AP performs different portions of the Tx-SLS—training sequence transmissions on different Tx sectors—during different respective short beacon transmission intervals in the beacon interval. While an extension link between the AP and a STA is sound, the STA can use the training sequence transmissions of the Tx-SLS to check the link quality and verify or update the ID of the best Tx sector of the AP.

Upon detecting a loss of the extension link, such as based on non-acknowledgment of a PPDU transmission and retransmission as depicted in the example in FIG. 7, a STA switches to omni reception mode and monitors the extension band for training sequence transmissions during each short beacon transmission interval. The STA can start with a first short beacon transmission interval following the link loss detection, rather than having to wait until a beacon transmission interval at the beginning of a next beacon interval as in the example periodic beacon-based link recovery procedure depicted in FIG. 6. In some examples, the training sequences that the AP transmits during the Tx-SLS can be short training sequences, such as 1 µs training sequences. In some examples, the training sequences that the AP transmits during the Tx-SLS can carry the sector IDs associated with the transmissions of those training sequences. In other examples, the sector IDs may be conveyed in SIG fields. In some examples, the STA can count down to the completion of the Tx-SLS and then transmit SLS feedback to the AP.

Figure 8A:
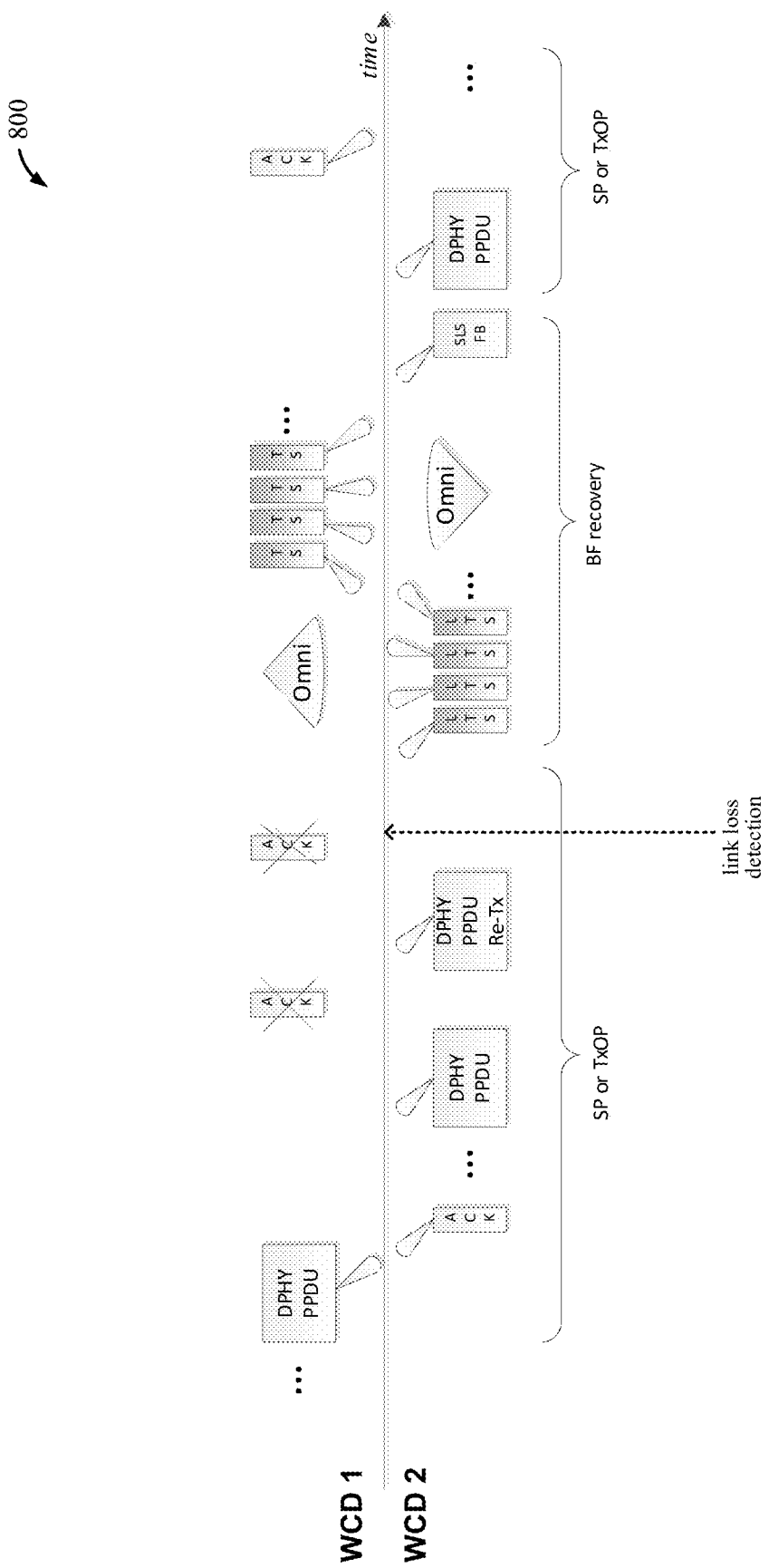
FIG. 8A shows a timing diagram depicting a first example STA-initiated fast link recovery procedure.

FIG. 8A shows a timing diagram 800 depicting a first example STA-initiated fast link recovery procedure. In some examples, in operating environment 500 of FIG. 5, the wireless communication devices 502 and 504 may use the example STA-initiated fast link recovery procedure depicted in FIG. 8A to recover the wireless communication link 508. According to the example STA-initiated fast link recovery procedure depicted in FIG. 8A, link recovery can be initiated proactively, via transmission of training sequences on an extension band at any non-SP/TXOP time, by a wireless communication device that detects a loss of an extension link.

Upon detecting a loss of an extension link with a wireless communication device WCD 1 during an SP or TXOP, such as based on non-acknowledgment of a PPDU transmission and retransmission as depicted in the example in FIG. 8A, a wireless communication device WCD 2 can wait until an end of the SP or TXOP, and then perform a Tx-SLS on the extension band. During the Tx-SLS, the wireless communication device WCD 2 can sweep training sequence transmissions through its Tx sectors. These can be transmissions of long training sequences, in order to provide support for blind detection and timing and frequency estimation at low signal-to-noise ratios. The wireless communication devices WCD 1 and WCD 2 can switch to omni reception mode upon completion of the SP or TXOP, and the wireless communication device WCD 1 can identify a best Tx sector for the wireless communication device WCD 2 by measuring the training sequence transmissions that it receives from the wireless communication device WCD 2 via the extension band during the Tx-SLS.

The wireless communication device WCD 1 can then perform a Tx-SLS of its own on the extension band. The training sequences transmissions of the Tx-SLS can include an indication of the best Tx sector for the wireless communication device WCD 2, as determined by the wireless communication device WCD 1 during the first Tx-SLS from WCD 2. The wireless communication device WCD 2 can identify a best Tx sector for the wireless communication device WCD 1 by measuring the training sequence transmissions that it receives from the wireless communication device WCD 2 via the extension band during the second Tx-SLS. The wireless communication device WCD 2 can transmit SLS feedback to the wireless communication device WCD 1 via the extension band to inform the wireless communication device WCD 1 of its best Tx sector.

Figure 8B:
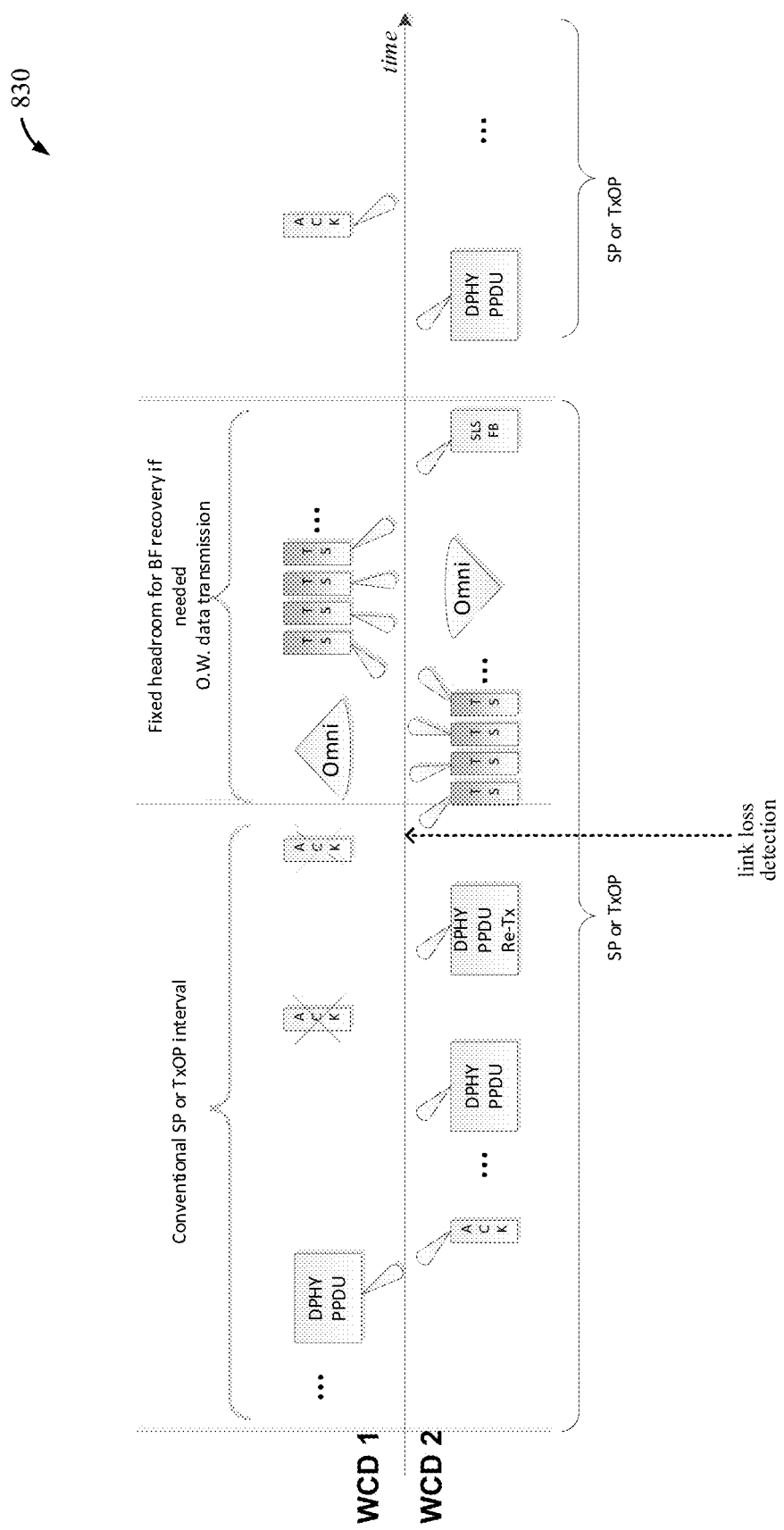
FIG. 8B shows a timing diagram depicting a second example STA-initiated fast link recovery procedure.

FIG. 8B shows a timing diagram 830 depicting a second example STA-initiated fast link recovery procedure. In some examples, in operating environment 500 of FIG. 5, the wireless communication devices 502 and 504 may use the example STA-initiated fast link recovery procedure depicted in FIG. 8B to recover the wireless communication link 508. According to the example STA-initiated fast link recovery procedure depicted in FIG. 8B, a wireless communication device that detects a loss of an extension link can initiate link recovery proactively, within an SP or TXOP, by transmitting training sequences during a headroom interval at the end of the SP or TXOP, which is otherwise used for data transmission.

Upon detecting a loss of an extension link with a wireless communication device WCD 1 during an SP or TXOP, such as based on non-acknowledgment of a PPDU transmission and retransmission as depicted in the example in FIG. 8B, a wireless communication device WCD 2 can wait until a headroom interval of the SP or TXOP, and then perform a Tx-SLS on the extension band. During the Tx-SLS, the wireless communication device WCD 2 can sweep training sequence transmissions through its Tx sectors. The wireless communication devices WCD 1 and WCD 2 can switch to omni reception mode for the headroom interval, and the wireless communication device WCD 1 can identify a best Tx sector for the wireless communication device WCD 2 by measuring the training sequence transmissions that it receives from the wireless communication device WCD 2 via the extension band during the Tx-SLS.

The wireless communication device WCD 1 can then perform a Tx-SLS of its own on the extension band. The training sequences transmissions of the Tx-SLS can include an indication of the best Tx sector for the wireless communication device WCD 2, as determined by the wireless communication device WCD 1 during the first Tx-SLS. The wireless communication device WCD 2 can identify a best Tx sector for the wireless communication device WCD 1 by measuring the training sequence transmissions that it receives from the wireless communication device WCD 2 via the extension band during the second Tx-SLS. The wireless communication device WCD 2 can transmit SLS feedback to the wireless communication device WCD 1 via the extension band to inform the wireless communication device WCD 1 of its best Tx sector.

Figure 8C:
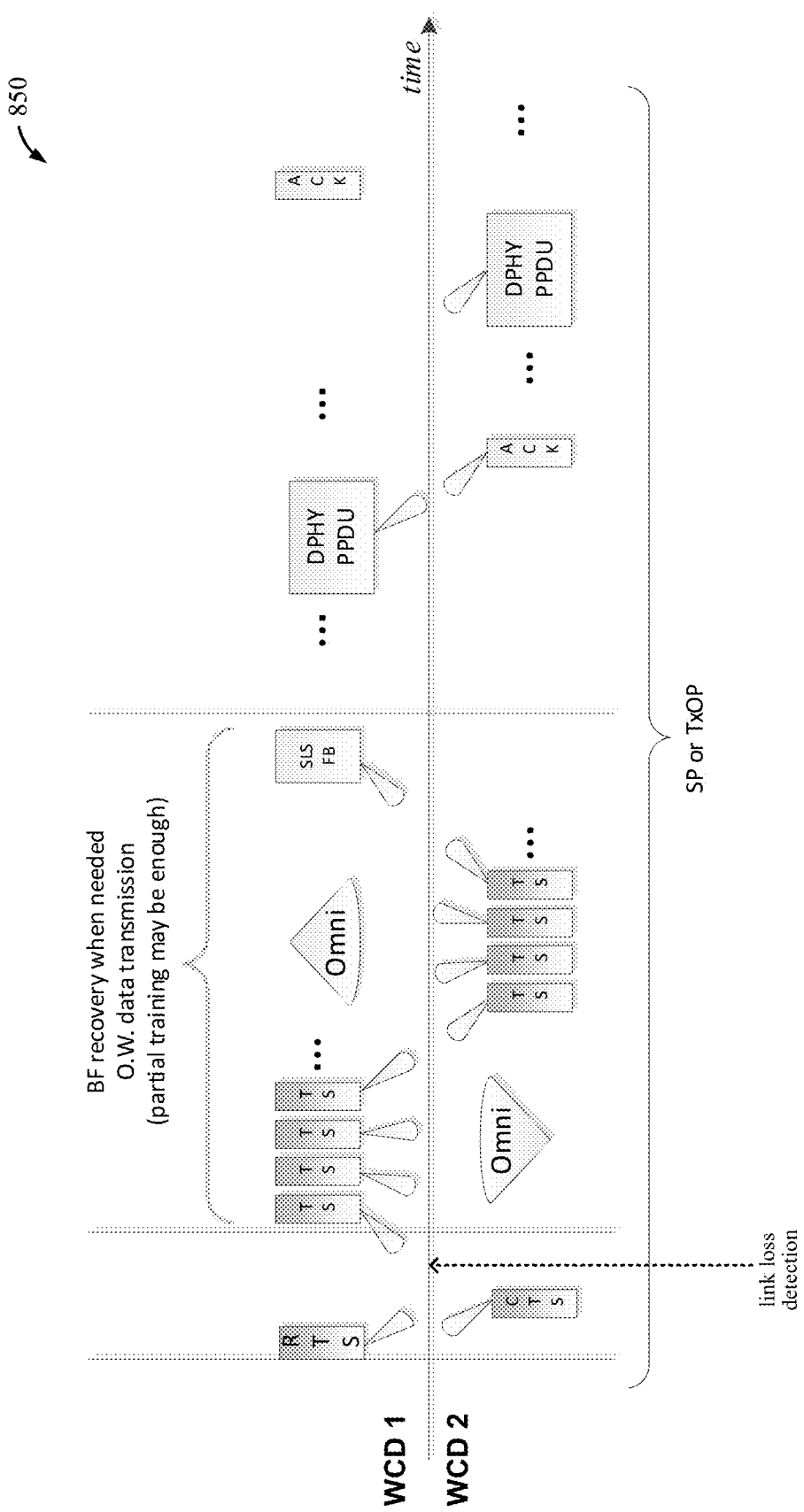
FIG. 8C shows a timing diagram depicting a third example STA-initiated fast link recovery procedure.

FIG. 8C shows a timing diagram 850 depicting a third example STA-initiated fast link recovery procedure. In some examples, in operating environment 500 of FIG. 5, the wireless communication devices 502 and 504 may use the example STA-initiated fast link recovery procedure depicted in FIG. 8C to recover the wireless communication link 508. According to the example STA-initiated fast link recovery procedure depicted in FIG. 8C, wireless communication devices WCD 1 and WCD 2 can use an RTS/CTS exchange at the onset of an SP or TXOP to check the integrity of the extension link, and can initiate link recovery during the SP or TXOP if the RTS/CTS fails.

The wireless communication device WCD 1, having data to transmit to the wireless communication device WCD 2, can transmit an RTS to the wireless communication device WCD 2 at the start of the SP or TXOP. If it receives the RTS from the wireless communication device WCD 1, the wireless communication device WCD 2 can respond by transmitting a CTS to the wireless communication device WCD 1. If the wireless communication device WCD 1 receives the CTS from the wireless communication device WCD 2, the wireless communication device WCD 1 can begin transmitting data to the wireless communication device WCD 2 one short interframe space (SIFS) after receipt of the CTS. If the wireless communication device WCD 1 does not receive the CTS, the wireless communication device WCD 1 can conclude that the extension link has been lost, and that link recovery should be initiated once a pre-agreed amount of time $T_{lr}$ has elapsed since the non-receipt of the CTS, where $T_{lr}$ is larger than one SIFS. If the wireless communication device WCD 2 does not begin receiving data from the wireless communication device WCD 1 once one SIFS has elapsed since transmission of the CTS, the wireless communication device WCD 2 can conclude that the extension link has been lost, and that link recovery should be initiated once the pre-agreed amount of time $T_{lr}$ has elapsed since transmission of the CTS.

To initiate the link recovery, the wireless communication device WCD 1 can perform a Tx-SLS on the extension band. During the Tx-SLS, the wireless communication device WCD 1 can sweep training sequence transmissions through its Tx sectors. The wireless communication devices WCD 1 and WCD 2 can switch to omni reception mode upon the failure of the RTS/CTS exchange, and the wireless communication device WCD 2 can identify a best Tx sector for the wireless communication device WCD 1 by measuring the training sequence transmissions that it receives from the wireless communication device WCD 1 via the extension band during the Tx-SLS.

The wireless communication device WCD 2 can then perform a Tx-SLS of its own on the extension band. The training sequences transmissions of the Tx-SLS can include an indication of the best Tx sector for the wireless communication device WCD 1, as determined by the wireless communication device WCD 2 during the first Tx-SLS. The wireless communication device WCD 1 can identify a best Tx sector for the wireless communication device WCD 2 by measuring the training sequence transmissions that it receives from the wireless communication device WCD 2 via the extension band during the second Tx-SLS. The wireless communication device WCD 1 can transmit SLS feedback to the wireless communication device WCD 2 via the extension band to inform the wireless communication device WCD 2 of its best Tx sector.

Figure 9A:
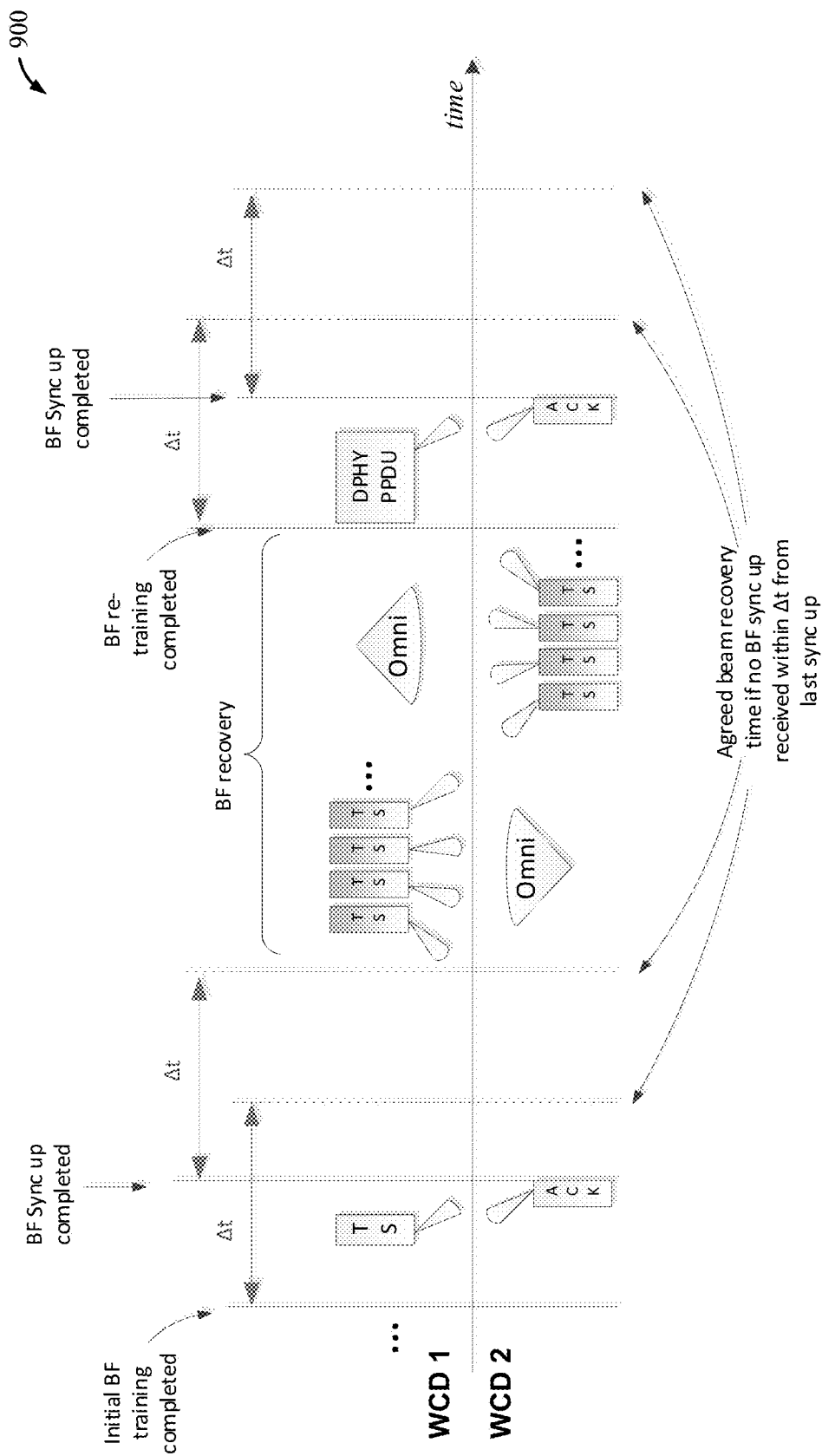
FIG. 9A shows a timing diagram depicting a first example monitored-link flexible link recovery procedure.

FIG. 9A shows a timing diagram 900 depicting a first example monitored-link flexible link recovery procedure. In some examples, in operating environment 500 of FIG. 5, the wireless communication devices 502 and 504 may use the example monitored-link flexible link recovery procedure depicted in FIG. 9A to recover the wireless communication link 508.

According to the example monitored-link flexible link recovery procedure depicted in FIG. 9A, the integrity of an extension link between a wireless communication device WCD 1 and a wireless communication device WCD 2 can be recurringly verified over time. Upon initial establishment of the extension link, a "watchdog" counter can be set to begin counting down from a value representing an amount of time for which the extension link can be assumed to be sound, and after which beam recovery procedure will be triggered. If successful data communication occurs prior to expiration of the watchdog counter, the watchdog counter can be reset. Before the watchdog counter expires, a beamforming sync-up exchange can be initiated to check the integrity of the extension link. If the beamforming sync-up is successful, indicating that the extension link is sound, the watchdog counter can be reset. If the beamforming sync-up is unsuccessful, the devices can conduct beamforming training to recover the extension link when the watchdog counter expires.

Figure 9B:
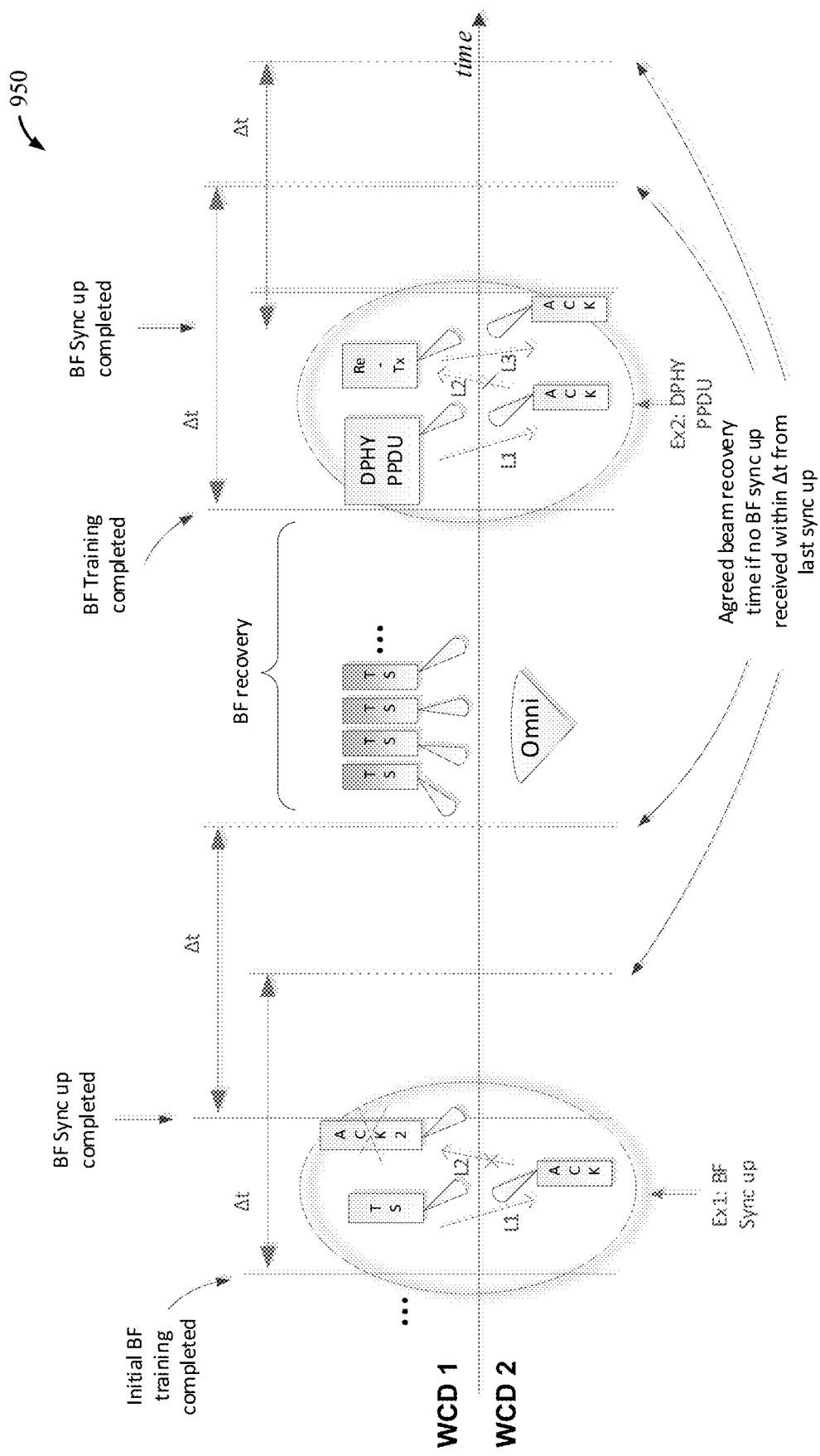
FIG. 9B shows a timing diagram depicting a second example monitored-link flexible link recovery procedure.

FIG. 9B shows a timing diagram 930 depicting a second example monitored-link flexible link recovery procedure. In some examples, in operating environment 500 of FIG. 5, the wireless communication devices 502 and 504 may use the example monitored-link flexible link recovery procedure depicted in FIG. 9B to recover the wireless communication link 508. According to the example monitored-link flexible link recovery procedure depicted in FIG. 9B, a "double ACK" scheme can be implemented to mitigate the possibility of mismatches in the watchdog counter value, as respectively understood by the wireless communication devices WCD 1 and WCD 2. During beamforming sync-up, the wireless communication device WCD 2 can tell whether the wireless communication device WCD 1 received its ACK—and thus, whether the wireless communication device WCD 1 has reset its watchdog counter due to successful beamforming sync-up—based on whether it receives a second ACK from the wireless communication device WCD 1. Similarly, when the wireless communication device WCD 1 transmits a DPHY PPDU to the wireless communication device WCD 2 after beamforming training, the wireless communication device WCD 2 can tell whether the wireless communication device WCD 1 received its ACK of the PPDU—and thus, whether the wireless communication device WCD 1 has reset its watchdog counter due to successful PPDU transmission—based on whether it receives a second ACK from the wireless communication device WCD 1.

Figure 10:
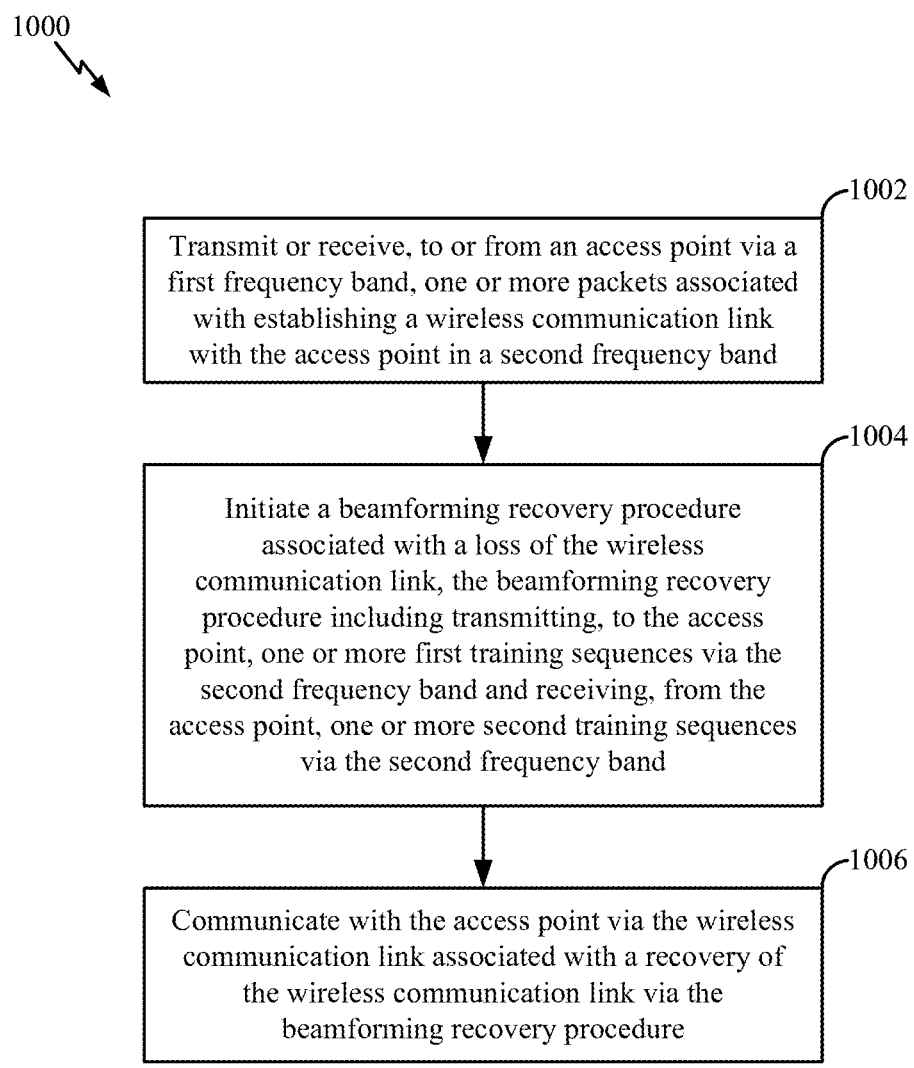
FIG. 10 shows a flowchart illustrating a first example process performable by a wireless communication device that supports recovery mechanisms for wireless extension links.

FIG. 10 shows a flowchart illustrating an example process 1000 performable by a wireless communication device that supports recovery mechanisms for wireless extension links. The operations of the process 1000 may be implemented by a wireless STA or AP, or its components, as described herein. In some examples, the process 1000 may be performed by a wireless communication device, such as the wireless communication device 504 described with reference to FIG. 5 or the wireless communication device 1200 described with reference to FIG. 12, operating as or within a wireless STA. In some examples, the process 1000 may be performed by a wireless communication device, such as the wireless communication device 502 described with reference to FIG. 5 or the wireless communication device 1200 described with reference to FIG. 12, operating as or within a wireless AP. In some examples, the process 1000 may be performed by a wireless AP such as the wireless AP 102 described with reference to FIG. 1 or the wireless AP 402 described with reference to FIG. 4. In some examples, the process 1000 may be performed by a wireless STA such as one of the wireless STAs 104 described with reference to FIG. 1 or one of the wireless STAs 404 described with reference to FIG. 4.

In some examples, in block 1002, the wireless communication device can transmit or receive, to or from an access point via a first frequency band, one or more packets associated with establishing a wireless communication link with the access point in a second frequency band. For example, in the operating environment 500 of FIG. 5, the wireless communication device 504 can receive the beam search trigger 510 from the wireless communication device 502 (operating as a wireless AP) via the wireless communication link 506. In some examples, the first frequency band can be a sub-7 GHz frequency band, such as a 2.4 GHz band, a 5 GHz band, or a 6 GHz band. In some examples, the second frequency band can be an mmWave frequency band, such as a 60 GHz band or a 45 GHz band.

In some examples, in block 1004, the wireless communication device can a initiate a link recovery procedure associated with a loss of the wireless communication link, and the link recovery procedure can include transmitting, to the access point, one or more first training sequences via the second frequency band and receiving, from the access point, one or more second training sequences via the second frequency band. For example, in the operating environment 500 of FIG. 5, the wireless communication device 504 can initiate a link recovery procedure associated with a loss of the wireless communication link 508, and the link recovery procedure can include transmitting one or more training sequences 512B to the wireless communication device 502 via the frequency band of the wireless communication link 508 and receiving one or more training sequences 512A from the wireless communication device 502 via the frequency band of the wireless communication link 508.

In some examples, the wireless communication device and the access point can engage in a beam search process as part of the link recovery procedure, and the wireless communication device can transmit the one or more first training sequences from the access point and receive the one or more second training sequences from the access point in conjunction with the beam search process.

In some examples, the beam search process can be a robust beam search process that includes an initiator Tx-SLS, a responder Tx-SLS, an initiator Rx-BRP, and a responder Rx-BRP. In some examples, according to the robust beam search process, the responder can provide SLS feedback to the initiator in conjunction with the responder Tx-SLS, and the initiator can provide SLS feedback to the responded following the responder Tx-SLS.

In some examples, the beam search process can be a streamlined beam search process that includes an initiator Tx-SLS and a responder Tx-SLS, but not an initiator Rx-SLS or a responder Rx-SLS. In some examples, according to the streamlined beam search process, the responder can provide SLS feedback to the initiator in conjunction with the responder Tx-SLS. In some examples, according to the streamlined beam search process, the initiator and the responder can exchange DPHY PPDUs featuring RX training (TRN) fields during a beam refinement phase following the responder Tx-SLS. In some examples, the initiator can provide SLS feedback to the responder following the beam refinement phase.

In some examples, the beam search process can be a fast beam search process that includes an initiator Tx-SLS, but not a responder Tx-SLS, an initiator Rx-SLS, or a responder Rx-SLS. In some examples, according to the fast beam search process, the responder can provide SLS feedback to the initiator via a sub-7 GHz link. In some examples, according to the fast beam search process, the initiator can transmit DPHY PPDUs featuring TRN fields to the responder during a beam refinement phase following the initiator Tx-SLS.

In some examples, the first training sequences can indicate respective beam identifiers (IDs) associated with Tx sectors of the wireless communication device. In some examples, the second training sequences can indicate respective beam IDs associated with Tx sectors of the access point. In some examples, each of the one or more first training sequences can be a one-symbol training sequence of a duration of 1 μs. In some examples, the wireless communication device can transmit the one or more first training sequences in one or more packets each including two non-high throughput short training fields (L-STFs) and one non-high throughput long training field (L-LTF). In some examples, each of the one or more first training sequences can be a 3.6 μs training sequence indicating a respective sequence identifier (ID).

In some examples, the wireless communication device can initiate the link recovery procedure during an SP or TXOP obtained by the wireless communication device. For instance, in some examples, the link recovery procedure can be a STA-initiated fast link recovery procedure such as that depicted in FIG. 8B, and the wireless communication device can initiate the link recovery procedure during a headroom interval at the end of an SP or TXOP. In another example, the link recovery procedure can be a STA-initiated fast link recovery procedure such as that depicted in FIG. 8C, and the wireless communication device can initiate an RTS/CTS exchange during an SP or TXOP and detect the loss of the wireless communication link associated with a failure of the RTS/CTS exchange, and can initiate the link recovery procedure during the SP or TXOP associated with the loss of the wireless communication link.

In some examples, the wireless communication device can initiate the link recovery procedure outside of any SP or TXOP obtained by the wireless communication device. For instance, in some examples, the link recovery procedure can be a STA-initiated fast link recovery procedure such as that depicted in FIG. 8A, and the wireless communication device can initiate the link recovery procedure at a time that falls outside of any SP or TXOP obtained by the wireless communication device.

In some examples, in block 1006, the wireless communication device can communicate with the access point via the wireless communication link associated with a recovery of the wireless communication link via the link recovery procedure. For example, in the operating environment 500 of FIG. 5, the wireless communication device 504 can communicate with the wireless communication device 502 via the wireless communication link 508 associated with a recovery of the wireless communication link 508 via the link recovery procedure. In some examples, the communicating with the access point via the wireless communication link can include transmitting a PPDU to the access point via the wireless communication link. In some examples, the wireless communication device can initiate a beam refinement phase in conjunction with transmitting the PPDU.

Figure 11:
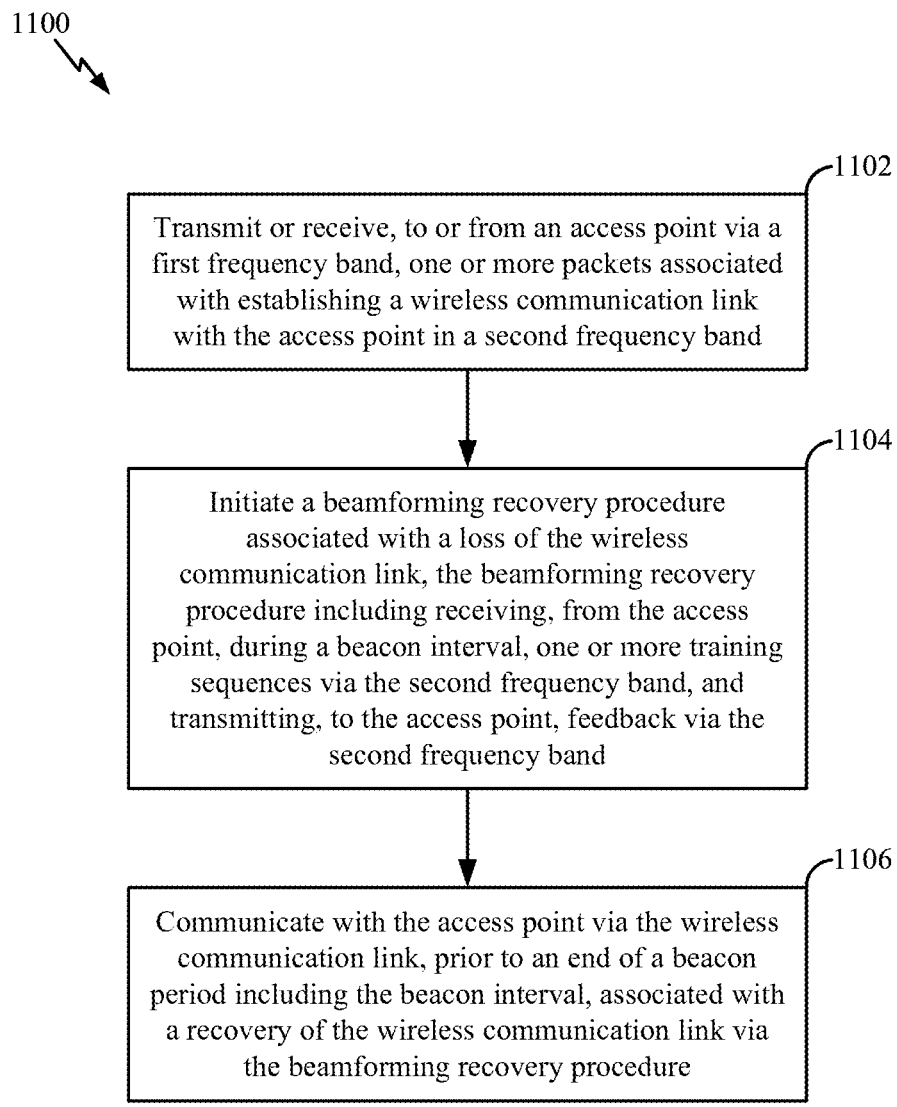
FIG. 11 shows a flowchart illustrating a second example process performable by a wireless communication device that supports recovery mechanisms for wireless extension links.

FIG. 11 shows a flowchart illustrating an example process 1100 performable by a wireless communication device that supports recovery mechanisms for wireless extension links. The operations of the process 1100 may be implemented by a wireless STA or AP, or its components, as described herein. In some examples, the process 1100 may be performed by a wireless communication device, such as the wireless communication device 504 described with reference to FIG. 5 or the wireless communication device 1200 described with reference to FIG. 12, operating as or within a wireless STA. In some examples, the process 1100 may be performed by a wireless communication device, such as the wireless communication device 502 described with reference to FIG. 5 or the wireless communication device 1200 described with reference to FIG. 12, operating as or within a wireless AP. In some examples, the process 1100 may be performed by a wireless AP such as the wireless AP 102 described with reference to FIG. 1 or the wireless AP 402 described with reference to FIG. 4. In some examples, the process 1100 may be performed by a wireless STA such as one of the wireless STAs 104 described with reference to FIG. 1 or one of the wireless STAs 404 described with reference to FIG. 4.

In some examples, in block 1102, the wireless communication device can transmit or receive, to or from an access point via a first frequency band, one or more packets associated with establishing a wireless communication link with the access point in a second frequency band. For example, in the operating environment 500 of FIG. 5, the wireless communication device 504 can receive the beam search trigger 510 from the wireless communication device 502 (operating as a wireless AP) via the wireless communication link 506. In some examples, the first frequency band can be a sub-7 GHz frequency band, such as a 2.4 GHz band, a 5 GHz band, or a 6 GHz band. In some examples, the second frequency band can be an mmWave frequency band, such as a 60 GHz band or a 45 GHz band.

In some examples, in block 1104, the wireless communication device can initiate a link recovery procedure associated with a loss of the wireless communication link, and the link recovery procedure can include receiving, from the access point, during a beacon transmission interval, one or more training sequences via the second frequency band, and transmitting, to the access point, feedback via the second frequency band. For example, in the operating environment 500 of FIG. 5, the wireless communication device 504 can initiate a link recovery procedure associated with a loss of the wireless communication link 508, and the link recovery procedure can include receiving one or more training sequences 512A from the wireless communication device 502 via the frequency band of the wireless communication link 508 and transmitting feedback 514B to the wireless communication device 502 via the frequency band of the wireless communication link 508.

In some examples, the one or more training sequences can indicate respective beam IDs associated with Tx sectors of the access point. In some examples, the one or more training sequences can be transmissions associated with a transmit sector-level sweep (Tx-SLS) performed on the second frequency band by the access point during the beacon transmission interval. In some examples, the wireless communication device can transmit the feedback following a completion of the Tx-SLS. In some examples, the feedback can be sector-level sweep (SLS) feedback.

In some examples, in block 1106, the wireless communication device can communicate with the access point via the wireless communication link, prior to an end of a beacon interval including the beacon transmission interval, associated with a recovery of the wireless communication link via the link recovery procedure. For example, in the operating environment 500 of FIG. 5, prior to an end of a beacon interval included in the beacon transmission interval during which it received the one or more training sequences 512A from the wireless communication device 502, the wireless communication device 504 can communicate with the wireless communication device 502 via the wireless communication link 508 associated with a recovery of the wireless communication link 508 via the link recovery procedure.

Figure 12:
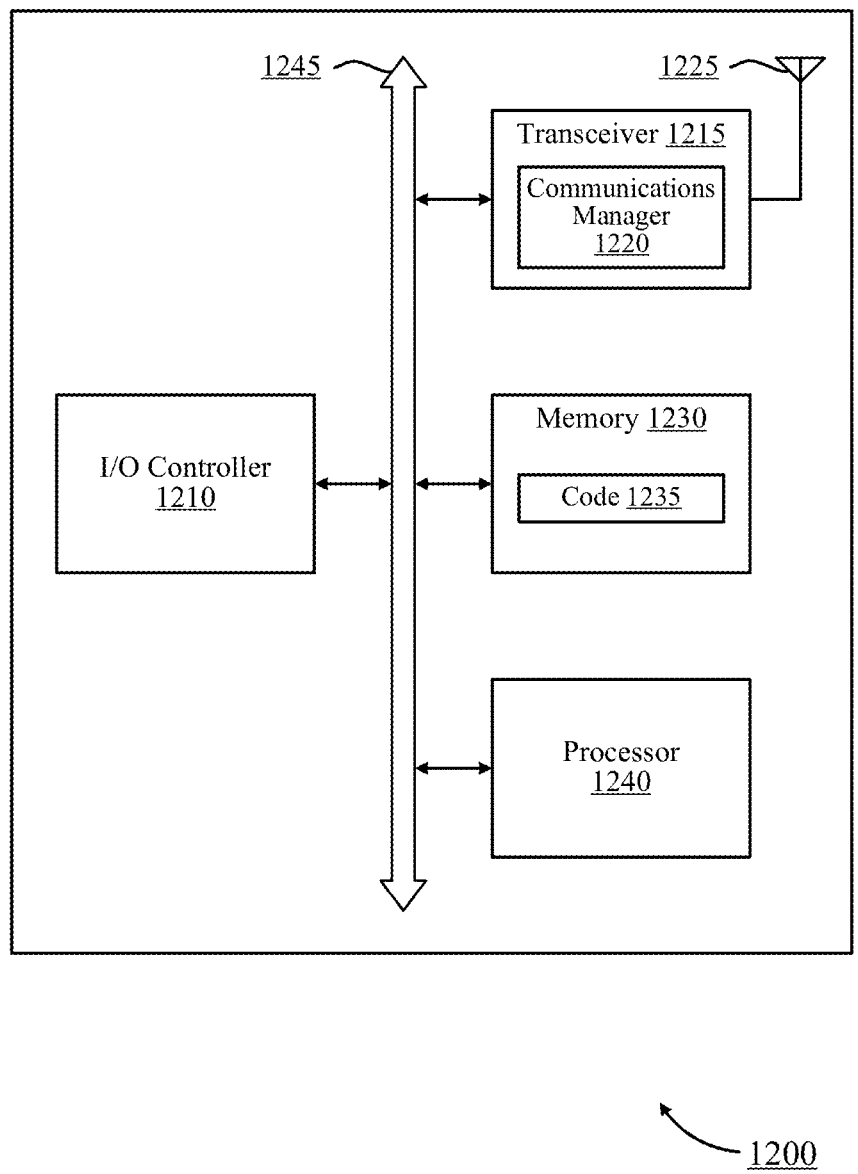
FIG. 12 shows a block diagram of an example wireless communication device that supports recovery mechanisms for wireless extension links.

FIG. 12 shows a block diagram of an example wireless communication device 1200 that supports the application of spectral masks and spectral flatness parameters according to aspects described herein. In some examples, the wireless communication device 1200 can be configured or operable to perform the process 1000 described above with reference to FIG. 10, the process 1100 described above with reference to FIG. 11, or both. In some examples, the wireless communication device 1200 may be representative of one or both of wireless communication devices 502 and 504 described above with reference to FIG. 5. In various examples, the wireless communication device 1200 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 1200 can be chip, SoC, chipset, package or device for use in a wireless AP, such as the wireless AP 102 described above with reference to FIG. 1 or the wireless AP 402 described above with reference to FIG. 4. In some other examples, the wireless communication device 1200 can be a wireless AP that includes such a chip, SoC, chipset, package or device as well as at least one antenna. In yet other examples, the wireless communication device 1200 can be a chip, SoC, chipset, package or device for use in a wireless STA, such one of the wireless STAs 104 described with reference to FIG. 1 or one of the wireless STAs 404 described with reference to FIG. 4. In still other examples, the wireless communication device 1200 can be a wireless STA that includes such a chip, SoC, chipset, package or device as well as at least one antenna.

The wireless communication device 1200 can be capable of transmitting and receiving wireless communications in the form of, for example, wireless packets. For example, the wireless communication device 1200 can be configured or operable to transmit and receive packets in the form of physical layer PPDUs and MPDUs conforming to one or more of the IEEE 802.11 family of wireless communication protocol standards. In some examples, the wireless communication device 1200 can also include or can be coupled with an application processor which may be further coupled with another memory. In some examples, the wireless communication device 1200 can further include at least one external network interface that enables communication with a core network or backhaul network to gain access to external networks including the Internet. In some examples, the wireless communication device 1200 can further include a user interface (UI) (such as a touchscreen or keypad) and a display, which may be integrated with the UI to form a touchscreen display. In some examples, the wireless communication device 1200 can further include one or more sensors such as, for example, one or more inertial sensors, accelerometers, temperature sensors, pressure sensors, or altitude sensors.

The wireless communication device 1200 may include components for bi-directional communications including components for transmitting and receiving communications, such as a communications manager 1220, an input/output (I/O) controller 1210, a transceiver 1215, an antenna 1225, a memory 1230, code 1235 and a processor 1240. These components may be in electronic communication or otherwise coupled (such as operatively, communicatively, functionally, electronically, electrically) via one or more buses (such as a bus 1245).

The I/O controller 1210 may manage input and output signals for the wireless communication device 1200. The I/O controller 1210 also may manage peripherals not integrated into the wireless communication device 1200. In some examples, the I/O controller 1210 may represent a physical connection or port to an external peripheral. In some examples, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some examples, the I/O controller 1210 may be implemented as part of a processor or processing system, such as the processor 1240. In some examples, a user may interact with the wireless communication device 1200 via the I/O controller 1210 or via hardware components controlled by the I/O controller 1210.

In some examples, the wireless communication device 1200 may include a single antenna 1225. However, in some other examples, the wireless communication device 1200 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 also may include a modem to modulate the packets, to provide the modulated packets to one or more antennas 1225 for transmission, and to demodulate packets received from the one or more antennas 1225.

In some examples, the transceiver 1215 may include one or more interfaces, such as one or more interfaces coupled with the one or more antennas 1225 that are configured to support various receiving or obtaining operations, or one or more interfaces coupled with the one or more antennas 1225 that are configured to support various transmitting or outputting operations, or a combination thereof. In some examples, the transceiver 1215 may include or be configured for coupling with one or more processors or memory components that are operable to perform or support operations associated with received or obtained information or signals, or to generate information or other signals for transmission or other outputting, or any combination thereof. In some examples, the transceiver 1215, or the transceiver 1215 and the one or more antennas 1225, or the transceiver 1215 and the one or more antennas 1225 and one or more processors or memory components (for example, the processor 1240, or the memory 1230, or both), may be included in a chip or chip assembly that is installed in the wireless communication device 1200.

The memory 1230 may include random access memory (RAM) and read-only memory (ROM). The memory 1230 may store computer-readable, computer-executable code 1235 including instructions that, when executed by the processor 1240, cause the wireless communication device 1200 to perform various functions described herein. The code 1235 may be stored in a non-transitory computer-readable medium such as system memory or another type of memory. In some examples, the code 1235 may not be directly executable by the processor 1240 but may cause a computer (for example, when compiled and executed) to perform functions described herein. In some examples, the memory 1230 may contain, among other things, a basic I/O system (BIOS) which may control basic hardware or software operation such as the interaction with peripheral components or devices.

The processor 1240 may be any one or more suitable processors capable of executing scripts or instructions of one or more software programs stored in the wireless communication device 1200 (such as within the memory 1230). In some examples, the processor 1240 may be a component of a processing system. A processing system may generally refer to a system or series of machines or components that receives inputs and processes the inputs to produce a set of outputs (which may be passed to other systems or components of, for example, the wireless communication device 1200). For example, a processing system of the wireless communication device 1200 may refer to a system including the various other components or subcomponents of the wireless communication device 1200, such as the processor 1240, or the transceiver 1215, or the communications manager 1220, or other components or combinations of components of the wireless communication device 1200. The processing system of the wireless communication device 1200 may interface with other components of the wireless communication device 1200, and may process information received from other components (such as inputs or signals) or output information to other components. For example, a chip or modem of the wireless communication device 1200 may include a processing system, a first interface to output information and a second interface to obtain information. In some examples, the first interface may refer to an interface between the processing system of the chip or modem and a transmitter, such that the wireless communication device 1200 may transmit information output from the chip or modem. In some examples, the second interface may refer to an interface between the processing system of the chip or modem and a receiver, such that the wireless communication device 1200 may obtain information or signal inputs, and the information may be passed to the processing system. A person having ordinary skill in the art will readily recognize that the first interface also may obtain information or signal inputs, and the second interface also may output information or signal outputs.

The communications manager 1220 may support wireless communication by wireless communication device 1200 in accordance with examples as disclosed herein. For example, the communications manager 1220 may be configured as or otherwise support a means for modulating a millimeter-wave (mmWave) carrier signal according to a baseband signal to generate a modulated mmWave carrier signal of a first bandwidth ($\beta_1$). The communications manager 1220 may further be configured as or otherwise support a means for transmitting a radio frequency (RF) signal associated with the modulated mmWave carrier signal in accordance with a first spectral mask for the mmWave carrier signal of the first bandwidth ($\beta_1$).

The first spectral mask can define an in-band frequency offset range and multiple transitional frequency offset ranges, including a respective transitional frequency offset range for each of multiple attenuation factors, where for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$). A width of the in-band frequency offset range can be wider than a width of an in-band frequency offset range of the second spectral mask for the nominal carrier signal scaled according to the ratio $S_\beta$.

In some examples, the communications manager 1220 may be configured to perform various operations (for example, receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the wireless communication device 1200 to perform various aspects of applying spectral masks and spectral flatness parameters as described herein, or the processor 1240 and the memory 1230 may be otherwise configured to perform or support such operations.

Implementation examples are described in the following numbered clauses:

Clause 1. A wireless communication device, including at least one memory, at least one processor communicatively coupled with the at least one memory, the at least one processor operable to cause the wireless communication device to transmit or receive, to or from an access point via a first frequency band, one or more packets associated with establishing a wireless communication link with the access point in a second frequency band, initiate a link recovery procedure associated with a loss of the wireless communication link, the link recovery procedure including transmitting, to the access point, one or more first training sequences via the second frequency band, and receiving, from the access point, one or more second training sequences via the second frequency band, and communicate, associated with a recovery of the wireless communication link via the link recovery procedure, with the access point via the wireless communication link.

Clause 2. The wireless communication device of clause 1, where the first frequency band is a sub-7 GHz frequency band and the second frequency band is a millimeter wave (mmWave) frequency band.

Clause 3. The wireless communication device of clause 2, where the mmWave frequency band is a 60 GHz frequency band or a 45 GHz frequency band.

Clause 4. The wireless communication device of any of clauses 1 to 3, where the at least one processor is operable to cause the wireless communication device to initiate the link recovery procedure during a service period (SP) or a transmission opportunity (TXOP) obtained by the wireless communication device.

Clause 5. The wireless communication device of clause 4, where the at least one processor is operable to cause the wireless communication device to initiate the link recovery procedure during a headroom interval at an end of the SP or TXOP.

Clause 6. The wireless communication device of clause 4, where the at least one processor is operable to cause the wireless communication device to initiate a request-to-send (RTS)/clear-to-send (CTS) exchange during the SP or TXOP, and detect the loss of the wireless communication link associated with a failure of the RTS/CTS exchange.

Clause 7. The wireless communication device of any of clauses 1 to 3, where the at least one processor is operable to cause the wireless communication device to initiate the link recovery procedure outside of any service period (SP) or transmission opportunity (TXOP) obtained by the wireless communication device.

Clause 8. The wireless communication device of any of clauses 1 to 7, where the communication with the access point via the wireless communication link associated with the recovery of the wireless communication link includes transmitting, to the access point, a physical layer protocol data unit (PPDU) via the wireless communication link, and where the at least one processor is operable to cause the wireless communication device to initiate a beam refinement phase in conjunction with transmitting the PPDU.

Clause 9. The wireless communication device of any of clauses 1 to 8, where each of the first training sequences indicates a respective beam identifier (ID).

Clause 10. The wireless communication device of any of clauses 1 to 9, where each of the one or more first training sequences is a one-symbol training sequence of a duration of 1 μs.

Clause 11. The wireless communication device of any of clauses 1 to 9, where the at least one processor is operable to cause the wireless communication device to transmit the one or more first training sequences in one or more packets each including two non-high throughput short training fields (L-STFs) and one non-high throughput long training field (L-LTF).

Clause 12. The wireless communication device of any of clauses 1 to 9, where each of the one or more first training sequences is a 3.6 μs training sequence indicating a respective sequence identifier (ID).

Clause 13. A wireless communication device, including at least one memory, at least one processor communicatively coupled with the at least one memory, the at least one processor operable to cause the wireless communication device to transmit or receive, to or from an access point via a first frequency band, one or more packets associated with establishing a wireless communication link with the access point in a second frequency band, initiate a link recovery procedure associated with a loss of the wireless communication link, the link recovery procedure including receiving, from the access point, during a beacon transmission interval, one or more training sequences via the second frequency band, and transmitting, to the access point, feedback via the second frequency band, and communicate with the access point via the wireless communication link, prior to an end of a beacon interval including the beacon transmission interval, associated with a recovery of the wireless communication link via the link recovery procedure.

Clause 14. The wireless communication device of clause 13, where the first frequency band is a sub-7 GHz frequency band and the second frequency band is a millimeter wave (mmWave) frequency band.

Clause 15. The wireless communication device of clause 14, where the mmWave frequency band is a 60 GHz frequency band or a 45 GHz frequency band.

Clause 16. The wireless communication device of any of clauses 13 to 15, where the one or more training sequences received from the access point are transmissions associated with a transmit sector-level sweep (Tx-SLS) performed on the second frequency band by the access point during the beacon transmission interval.

Clause 17. The wireless communication device of clause 16, where the at least one processor is operable to cause the wireless communication device to transmit the feedback following a completion of the Tx-SLS, where the feedback is sector-level sweep (SLS) feedback.

Clause 18. The wireless communication device of any of clauses 13 to 17, where the communication with the access point via the wireless communication link associated with the recovery of the wireless communication link includes transmitting, to the access point, a physical layer protocol data unit (PPDU) via the wireless communication link, and where the at least one processor is operable to cause the wireless communication device to initiate a beam refinement phase in conjunction with transmitting the PPDU.

Clause 19. The wireless communication device of any of clauses 13 to 18, where each of the training sequences indicates a respective beam identifier (ID).

Clause 20. A method for wireless communication by a wireless communication device, including transmitting or receiving, to or from an access point via a first frequency band, one or more packets associated with establishing a wireless communication link with the access point in a second frequency band, initiating a link recovery procedure associated with a loss of the wireless communication link, the link recovery procedure including transmitting, to the access point, one or more first training sequences via the second frequency band, and receiving, from the access point, one or more second training sequences via the second frequency band, and communicating with the access point via the wireless communication link associated with a recovery of the wireless communication link via the link recovery procedure.

Clause 21. The method of clause 20, where the first frequency band is a sub-7 GHz frequency band and the second frequency band is a millimeter wave (mmWave) frequency band.

Clause 22. The method of clause 21, where the mmWave frequency band is a 60 GHz frequency band or a 45 GHz frequency band.

Clause 23. The method of any of clauses 20 to 22, further including initiating the link recovery procedure during a service period (SP) or a transmission opportunity (TXOP) obtained by the wireless communication device.

Clause 24. The method of clause 23, further including initiating the link recovery procedure during a headroom interval at an end of the SP or TXOP.

Clause 25. The method of clause 23, further including initiating a request-to-send (RTS)/clear-to-send (CTS) exchange during the SP or TXOP, and detect the loss of the wireless communication link associated with a failure of the RTS/CTS exchange.

Clause 26. The method of any of clauses 20 to 22, further including initiating the link recovery procedure outside of any service period (SP) or transmission opportunity (TXOP) obtained by the wireless communication device.

Clause 27. The method of any of clauses 20 to 26, where the communication with the access point via the wireless communication link associated with the recovery of the wireless communication link includes transmitting, to the access point, a physical layer protocol data unit (PPDU) via the wireless communication link, and where the method further includes initiating a beam refinement phase in conjunction with transmitting the PPDU.

Clause 28. The method of any of clauses 20 to 27, where each of the first training sequences indicates a respective beam identifier (ID).

Clause 29. The method of any of clauses 20 to 28, where each of the one or more first training sequences is a one-symbol training sequence of a duration of 1 µs.

Clause 30. The method of any of clauses 20 to 28, further including transmitting the one or more first training sequences in one or more packets each including two non-high throughput short training fields (L-STFs) and one non-high throughput long training field (L-LTF).

Clause 31. The method of any of clauses 20 to 28, where each of the one or more first training sequences is a 3.6 µs training sequence indicating a respective sequence identifier (ID).

Clause 32. A method for wireless communication by a wireless communication device, including transmitting or receiving, to or from an access point via a first frequency band, one or more packets associated with establishing a wireless communication link with the access point in a second frequency band, initiating a link recovery procedure associated with a loss of the wireless communication link, the link recovery procedure including receiving, from the access point, during a beacon transmission interval, one or more training sequences via the second frequency band, and transmitting, to the access point, feedback via the second frequency band, and communicating with the access point via the wireless communication link, prior to an end of a beacon interval including the beacon transmission interval, associated with a recovery of the wireless communication link via the link recovery procedure.

Clause 33. The method of clause 32, where the first frequency band is a sub-7 GHz frequency band and the second frequency band is a millimeter wave (mmWave) frequency band.

Clause 34. The method of clause 33, where the mmWave frequency band is a 60 GHz frequency band or a 45 GHz frequency band.

Clause 35. The method of any of clauses 32 to 34, where the one or more training sequences received from the access point are transmissions associated with a transmit sector-level sweep (Tx-SLS) performed on the second frequency band by the access point during the beacon transmission interval.

Clause 36. The method of clause 35, further including transmitting the feedback following a completion of the Tx-SLS, where the feedback is sector-level sweep (SLS) feedback.

Clause 37. The method of any of clauses 32 to 36, where the communication with the access point via the wireless communication link associated with the recovery of the wireless communication link includes transmitting, to the access point, a physical layer protocol data unit (PPDU) via the wireless communication link, and where the method further includes initiating a beam refinement phase in conjunction with transmitting the PPDU.

Clause 38. The method of any of clauses 32 to 37, where each of the training sequences indicates a respective beam identifier (ID).

Clause 39. One or more non-transitory computer-readable media having instructions for wireless communication by a wireless communication device stored thereon which, when executed by a processor of the wireless communication device, cause the wireless communication device to transmit or receive, to or from an access point via a first frequency band, one or more packets associated with establishing a wireless communication link with the access point in a second frequency band, initiate a link recovery procedure associated with a loss of the wireless communication link, the link recovery procedure including transmitting, to the access point, one or more first training sequences via the second frequency band, and receiving, from the access point, one or more second training sequences via the second frequency band, and communicate with the access point via the wireless communication link associated with a recovery of the wireless communication link via the link recovery procedure.

Clause 40. The one or more non-transitory computer-readable media of clause 39, where the first frequency band is a sub-7 GHz frequency band and the second frequency band is a millimeter wave (mmWave) frequency band.

Clause 41. The one or more non-transitory computer-readable media of clause 40, where the mmWave frequency band is a 60 GHz frequency band or a 45 GHz frequency band.

Clause 42. The one or more non-transitory computer-readable media of any of clauses 39 to 41, further having instructions for wireless communication by the wireless communication device stored thereon which, when executed by the processor of the wireless communication device, cause the wireless communication device to initiate the link recovery procedure during a service period (SP) or a transmission opportunity (TXOP) obtained by the wireless communication device.

Clause 43. The one or more non-transitory computer-readable media of clause 42, further having instructions for wireless communication by the wireless communication device stored thereon which, when executed by the processor of the wireless communication device, cause the wireless communication device to initiate the link recovery procedure during a headroom interval at an end of the SP or TXOP.

Clause 44. The one or more non-transitory computer-readable media of clause 42, further having instructions for wireless communication by the wireless communication device stored thereon which, when executed by the processor of the wireless communication device, cause the wireless communication device to initiate a request-to-send (RTS)/clear-to-send (CTS) exchange during the SP or TXOP, and detect the loss of the wireless communication link associated with a failure of the RTS/CTS exchange.

Clause 45. The one or more non-transitory computer-readable media of any of clauses 39 to 41, further having instructions for wireless communication by the wireless communication device stored thereon which, when executed by the processor of the wireless communication device, cause the wireless communication device to initiate the link recovery procedure outside of any service period (SP) or transmission opportunity (TXOP) obtained by the wireless communication device.

Clause 46. The one or more non-transitory computer-readable media of any of clauses 39 to 45, where the communication with the access point via the wireless communication link associated with the recovery of the wireless communication link includes transmitting, to the access point, a physical layer protocol data unit (PPDU) via the wireless communication link, the one or more non-transitory computer-readable media further having instructions for wireless communication by the wireless communication device stored thereon which, when executed by the processor of the wireless communication device, cause the wireless communication device to initiate a beam refinement phase in conjunction with transmitting the PPDU.

Clause 47. The one or more non-transitory computer-readable media of any of clauses 39 to 46, where each of the first training sequences indicates a respective beam identifier (ID).

Clause 48. The one or more non-transitory computer-readable media of any of clauses 39 to 47, where each of the one or more first training sequences is a one-symbol training sequence of a duration of 1 µs.

Clause 49. The one or more non-transitory computer-readable media of any of clauses 39 to 47, further having instructions for wireless communication by the wireless communication device stored thereon which, when executed by the processor of the wireless communication device, cause the wireless communication device to transmit the one or more first training sequences in one or more packets each including two non-high throughput short training fields (L-STFs) and one non-high throughput long training field (L-LTF).

Clause 50. The one or more non-transitory computer-readable media of any of clauses 39 to 47, where each of the one or more first training sequences is a 3.6 µs training sequence indicating a respective sequence identifier (ID).

Clause 51. One or more non-transitory computer-readable media having instructions for wireless communication by a wireless communication device stored thereon which, when executed by a processor of the wireless communication device, cause the wireless communication device to transmit or receive, to or from an access point via a first frequency band, one or more packets associated with establishing a wireless communication link with the access point in a second frequency band, initiate a link recovery procedure associated with a loss of the wireless communication link, the link recovery procedure including receiving, from the access point, during a beacon transmission interval, one or more training sequences via the second frequency band, and transmitting, to the access point, feedback via the second frequency band, and communicate with the access point via the wireless communication link, prior to an end of a beacon interval including the beacon transmission interval, associated with a recovery of the wireless communication link via the link recovery procedure.

Clause 52. The one or more non-transitory computer-readable media of clause 51, where the first frequency band is a sub-7 GHz frequency band and the second frequency band is a millimeter wave (mmWave) frequency band.

Clause 53. The one or more non-transitory computer-readable media of clause 52, where the mmWave frequency band is a 60 GHz frequency band or a 45 GHz frequency band.

Clause 54. The one or more non-transitory computer-readable media of any of clauses 51 to 53, where the one or more training sequences received from the access point are transmissions associated with a transmit sector-level sweep (Tx-SLS) performed on the second frequency band by the access point during the beacon transmission interval.

Clause 55. The one or more non-transitory computer-readable media of clause 54, further having instructions for wireless communication by the wireless communication device stored thereon which, when executed by the processor of the wireless communication device, cause the wireless communication device to transmit the feedback following a completion of the Tx-SLS, where the feedback is sector-level sweep (SLS) feedback.

Clause 56. The one or more non-transitory computer-readable media of any of clauses 51 to 55, where the communication with the access point via the wireless communication link associated with the recovery of the wireless communication link includes transmitting, to the access point, a physical layer protocol data unit (PPDU) via the wireless communication link, the one or more non-transitory computer-readable media further having instructions for wireless communication by the wireless communication device stored thereon which, when executed by the processor of the wireless communication device, cause the wireless communication device to initiate a beam refinement phase in conjunction with transmitting the PPDU.

Clause 57. The one or more non-transitory computer-readable media of any of clauses 51 to 56, where each of the training sequences indicates a respective beam identifier (ID).

Clause 58. An apparatus for wireless communication by a wireless communication device, including means for transmitting or receiving, to or from an access point via a first frequency band, one or more packets associated with establishing a wireless communication link with the access point in a second frequency band, means for initiating a link recovery procedure associated with a loss of the wireless communication link, the link recovery procedure including transmitting, to the access point, one or more first training sequences via the second frequency band, and receiving, from the access point, one or more second training sequences via the second frequency band, and means for communicating with the access point via the wireless communication link associated with a recovery of the wireless communication link via the link recovery procedure.

Clause 59. The apparatus of clause 58, where the first frequency band is a sub-7 GHz frequency band and the second frequency band is a millimeter wave (mmWave) frequency band.

Clause 60. The apparatus of clause 59, where the mmWave frequency band is a 60 GHz frequency band or a 45 GHz frequency band.

Clause 61. The apparatus of any of clauses 58 to 60, further including means for initiating the link recovery procedure during a service period (SP) or a transmission opportunity (TXOP) obtained by the wireless communication device.

Clause 62. The apparatus of clause 61, further including means for initiating the link recovery procedure during a headroom interval at an end of the SP or TXOP.

Clause 63. The apparatus of clause 61, further including means for initiating a request-to-send (RTS)/clear-to-send (CTS) exchange during the SP or TXOP, and detect the loss of the wireless communication link associated with a failure of the RTS/CTS exchange.

Clause 64. The apparatus of any of clauses 58 to 60, further including means for initiating the link recovery procedure outside of any service period (SP) or transmission opportunity (TXOP) obtained by the wireless communication device.

Clause 65. The apparatus of any of clauses 58 to 64, where the communication with the access point via the wireless communication link associated with the recovery of the wireless communication link includes transmitting, to the access point, a physical layer protocol data unit (PPDU) via the wireless communication link, and where the apparatus further includes means for initiating a beam refinement phase in conjunction with transmitting the PPDU.

Clause 66. The apparatus of any of clauses 58 to 65, where each of the first training sequences indicates a respective beam identifier (ID).

Clause 67. The apparatus of any of clauses 58 to 66, where each of the one or more first training sequences is a one-symbol training sequence of a duration of 1 μs.

Clause 68. The apparatus of any of clauses 58 to 66, further including means for transmitting the one or more first training sequences in one or more packets each including two non-high throughput short training fields (L-STFs) and one non-high throughput long training field (L-LTF).

Clause 69. The apparatus of any of clauses 58 to 66, where each of the one or more first training sequences is a 3.6 μs training sequence indicating a respective sequence identifier (ID).

Clause 70. A apparatus for wireless communication by a wireless communication device, including means for transmitting or receiving, to or from an access point via a first frequency band, one or more packets associated with establishing a wireless communication link with the access point in a second frequency band, means for initiating a link recovery procedure associated with a loss of the wireless communication link, the link recovery procedure including receiving, from the access point, during a beacon transmission interval, one or more training sequences via the second frequency band, and transmitting, to the access point, feedback via the second frequency band, and means for communicating with the access point via the wireless communication link, prior to an end of a beacon interval including the beacon transmission interval, associated with a recovery of the wireless communication link via the link recovery procedure.

Clause 71. The apparatus of clause 70, where the first frequency band is a sub-7 GHz frequency band and the second frequency band is a millimeter wave (mmWave) frequency band.

Clause 72. The apparatus of clause 71, where the mmWave frequency band is a 60 GHz frequency band or a 45 GHz frequency band.

Clause 73. The apparatus of any of clauses 70 to 72, where the one or more training sequences received from the access point are transmissions associated with a transmit sector-level sweep (Tx-SLS) performed on the second frequency band by the access point during the beacon transmission interval.

Clause 74. The apparatus of clause 73, further including means for transmitting the feedback following a completion of the Tx-SLS, where the feedback is sector-level sweep (SLS) feedback.

Clause 75. The apparatus of any of clauses 70 to 74, where the communication with the access point via the wireless communication link associated with the recovery of the wireless communication link includes transmitting, to the access point, a physical layer protocol data unit (PPDU) via the wireless communication link, and where the apparatus further includes means for initiating a beam refinement phase in conjunction with transmitting the PPDU.

Clause 76. The apparatus of any of clauses 70 to 75, where each of the training sequences indicates a respective beam identifier (ID).

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless communication device, comprising:
   at least one memory; and
   at least one processor communicatively coupled with the at least one memory, the at least one processor operable to cause the wireless communication device to:
   transmit or receive, to or from an access point via a first frequency band, one or more packets associated with establishing a wireless communication link with the access point in a second frequency band; and
   initiate a beamforming recovery procedure associated with a loss of the wireless communication link, wherein, to perform the beamforming recovery procedure, the at least one processor is operable to cause the wireless communication device to:
   transmit, to the access point, one or more first training sequences via the second frequency band;
   receive, from the access point, one or more second training sequences via the second frequency band; and
   communicate with the access point via the wireless communication link associated with a recovery of the wireless communication link via the beamforming recovery procedure.

2. The wireless communication device of claim 1, wherein the first frequency band is a sub-7 GHz frequency band and the second frequency band is a millimeter wave (mmWave) frequency band.

3. The wireless communication device of claim 2, wherein the mm Wave frequency band is a 60 GHz frequency band or a 45 GHz frequency band.

4. The wireless communication device of claim 1, wherein the at least one processor is operable to cause the wireless communication device to initiate the beamforming recovery procedure during a service period (SP) or a transmission opportunity (TXOP) obtained by the wireless communication device.

5. The wireless communication device of claim 4, wherein the at least one processor is operable to cause the wireless communication device to initiate the beamforming recovery procedure during a headroom interval at an end of the SP or TXOP.

6. The wireless communication device of claim 4, wherein the at least one processor is operable to cause the wireless communication device to initiate a request-to-send (RTS)/clear-to-send (CTS) exchange during the SP or TXOP, and detect the loss of the wireless communication link associated with a failure of the RTS/CTS exchange.

7. The wireless communication device of claim 1, wherein the at least one processor is operable to cause the wireless communication device to initiate the beamforming recovery procedure outside of any service period (SP) or transmission opportunity (TXOP) obtained by the wireless communication device.

8. The wireless communication device of claim 1, wherein to, communication with the access point via the wireless communication link associated with the recovery of the wireless communication link, the at least one processor is operable to cause the wireless communication device to transmit, to the access point, a physical layer protocol data unit (PPDU) via the wireless communication link, and wherein the at least one processor is operable to cause the wireless communication device to initiate a beam refinement phase in conjunction with transmission of the PPDU.

9. The wireless communication device of claim 1, wherein each of the one or more first training sequences indicates a respective beam identifier (ID).

10. The wireless communication device of claim 1, wherein each of the one or more first training sequences is a one-symbol training sequence of a duration of 1 µs.

11. The wireless communication device of claim 1, wherein the at least one processor is operable to cause the wireless communication device to transmit the one or more first training sequences in one or more packets each including two non-high throughput short training fields (L-STFs) and one non-high throughput long training field (L-LTF).

12. The wireless communication device of claim 1, wherein each of the one or more first training sequences is a 3.6 us training sequence indicating a respective sequence identifier (ID).

13. A wireless communication device, comprising:
at least one memory; and
at least one processor communicatively coupled with the at least one memory, the at least one processor operable to cause the wireless communication device to:
transmit or receive, to or from an access point via a first frequency band, one or more packets associated with establishing a wireless communication link with the access point in a second frequency band; and
initiate a beamforming recovery procedure associated with a loss of the wireless communication link, wherein, to perform the beamforming recovery procedure, the at least one processor is operable to cause the wireless communication device to:
receive, from the access point, during a beacon interval, one or more training sequences via the second frequency band;
transmit, to the access point, feedback via the second frequency band; and
communicate with the access point via the wireless communication link, prior to an end of a beacon period including the beacon interval, associated with a recovery of the wireless communication link via the beamforming recovery procedure.

14. The wireless communication device of claim 13, wherein the first frequency band is a sub-7 GHz frequency band and the second frequency band is a millimeter wave (mmWave) frequency band.

15. The wireless communication device of claim 13, wherein the one or more training sequences received from the access point are transmissions associated with a transmit sector-level sweep (Tx-SLS) performed on the second frequency band by the access point during the beacon interval.

16. The wireless communication device of claim 15, wherein the at least one processor is operable to cause the wireless communication device to transmit the feedback following a completion of the Tx-SLS, wherein the feedback is sector-level sweep (SLS) feedback.

17. A method for wireless communication by a wireless communication device, comprising:
transmitting or receiving, to or from an access point via a first frequency band, one or more packets associated with establishing a wireless communication link with the access point in a second frequency band; and
initiating a beamforming recovery procedure associated with a loss of the wireless communication link, the beamforming recovery procedure including:
transmitting, to the access point, one or more first training sequences via the second frequency band;
receiving, from the access point, one or more second training sequences via the second frequency band; and
communicating with the access point via the wireless communication link associated with a recovery of the wireless communication link via the beamforming recovery procedure.

18. The method of claim 17, wherein the first frequency band is a sub-7 GHz frequency band and the second frequency band is a millimeter wave (mmWave) frequency band.

19. The method of claim 18, wherein the mmWave frequency band is a 60 GHz frequency band or a 45 GHz frequency band.

20. The method of claim 17, further comprising initiating the beamforming recovery procedure during a service period (SP) or a transmission opportunity (TXOP) obtained by the wireless communication device.

21. The method of claim 20, further comprising initiating the beamforming recovery procedure during a headroom interval at an end of the SP or TXOP.

22. The method of claim 20, further comprising initiating a request-to-send (RTS)/clear-to-send (CTS) exchange during the SP or TXOP, and detect the loss of the wireless communication link associated with a failure of the RTS/CTS exchange.

23. The method of claim 17, further comprising initiating the beamforming recovery procedure outside of any service period (SP) or transmission opportunity (TXOP) obtained by the wireless communication device.

24. The method of claim 17, wherein each of the one or more first training sequences indicates a respective beam identifier (ID).

25. A method for wireless communication by a wireless communication device, comprising:
transmitting or receiving, to or from an access point via a first frequency band, one or more packets associated with establishing a wireless communication link with the access point in a second frequency band; and initiating a beamforming recovery procedure associated with a loss of the wireless communication link, the beamforming recovery procedure including:
receiving, from the access point, during a beacon interval, one or more training sequences via the second frequency band;
transmitting, to the access point, feedback via the second frequency band; and
communicating with the access point via the wireless communication link, prior to an end of a beacon period including the beacon interval, associated with a recovery of the wireless communication link via the beamforming recovery procedure.

\* \* \* \* \*